United States Patent
Wiedl

(10) Patent No.: US 8,200,548 B2
(45) Date of Patent: Jun. 12, 2012

(54) RECIPE ENGINE SYSTEM AND METHOD

(76) Inventor: Peter Wiedl, Uitikon (CH)

(*) Notice: Subject to any disclaimer, the term of this patent is extended or adjusted under 35 U.S.C. 154(b) by 346 days.

(21) Appl. No.: 12/551,095

(22) Filed: Aug. 31, 2009

(65) Prior Publication Data

US 2011/0055044 A1    Mar. 3, 2011

(51) Int. Cl.
*G06Q 30/00* (2006.01)
(52) U.S. Cl. .................................................. 705/26.5
(58) Field of Classification Search ............... 705/26.1, 705/26.5, 27.1
See application file for complete search history.

(56) References Cited

U.S. PATENT DOCUMENTS

| | | | |
|---|---|---|---|
| 2001/0025279 A1 | 9/2001 | Krulak et al. | |
| 2001/0038876 A1* | 11/2001 | Anderson | 426/549 |
| 2002/0174015 A1* | 11/2002 | Kuwana et al. | 705/15 |
| 2007/0294129 A1 | 12/2007 | Froseth et al. | |
| 2008/0195607 A1* | 8/2008 | Kutsumi et al. | 707/5 |
| 2009/0037288 A1 | 2/2009 | Christensen | |
| 2009/0075242 A1 | 3/2009 | Schwarzberg et al. | |
| 2009/0144081 A1 | 6/2009 | Harlan | |

OTHER PUBLICATIONS

Deborah Yao, "iPhone apps for nearly every waking minute," Apr. 11, 2009, The Berkshire Eagle.*
http://www.recipematcher.com/.
http://wwvv.recipekey.com/.
http://www.mealopedia.com/recipefinder.php.
http://www.bigoven.com/leftoverwizard2.aspx.
http://www.supercook.com/.
http://www.chiff.com/wine/food-match.htm.
http://www.bettycrocker.com/recipes/.

* cited by examiner

*Primary Examiner* — Jeffrey A Smith
*Assistant Examiner* — Brandy A Zukanovich
(74) *Attorney, Agent, or Firm* — Ostrolenk Faber LLP

(57) ABSTRACT

Disclosed is a system and method for providing electronic meal information to a user. At least one database stores recipe information, recipe attribute information process information and time information for recipes. A web site linked to the Internet includes a prompt for a user to submit at least one characteristic of a meal and another prompt for available ingredient information. Recipe information is generated by a selection of at least some of the stored electronic recipe information that corresponds to the characteristic of the meal and the available ingredients. An electronic list of ingredients is generated that includes the difference between ingredients for the meal, and the at least one ingredient that the user has available for the meal.

19 Claims, 21 Drawing Sheets

Fig. 6

- TYPE OF MEAL: — 602
- NUMBER/TYPE OF GUESTS: — 604
- DATE/TIME: — 606
- TYPE OF MEAL: — 608
- LOCATION: — 610
- CUSINE: — 612
- PREFERENCES: — 614
- ALLERGIES/DISLIKES: — 616

- AVAILABLE FOOD / INGREDIENT: — 702
- AVAILABLE FOOD / INGREDIENT: — 704
- AVAILABLE FOOD / INGREDIENT: — 706
- AVAILABLE FOOD / INGREDIENT: — 708
- AVAILABLE FOOD / INGREDIENT: — 710
- AVAILABLE FOOD / INGREDIENT: — 712
- AVAILABLE FOOD / INGREDIENT: — 714
- AVAILABLE WINE: — 716

700

RECIPE ENGINE SYSTEM AND METHOD

FIELD OF THE INVENTION

The present invention relates, generally, to recipes and, more particularly, to providing a platform for people to receive recipes and instructions for preparing foods according to various parameters.

DESCRIPTION OF THE RELATED ART

In the prior art, many people rely on cookbooks that have recipes and instructions to prepare individual courses of a meal, such as main dishes, side dishes, salads, deserts, and other courses. Over time, particularly with the advent of the Internet, more sources of recipes, meal preparation and cooking information has become available. For example, the popular website, www.bettycrocker.com, provides recipes of the day, and instructional video content to assist with the preparation of foods. Other sources, such as newspapers, television cooking shows and radio broadcasts also provide recipes and instructions for food preparation.

Unfortunately, recipes provided via cookbooks, television, radio or over the Internet do not consider many important parameters, such as the skills of the person preparing a meal, the food that is available to the preparer, the amount of time required to prepare a plurality of recipes, the season when food is to be prepared, and the preferences of the preparer and other people who will be eating the food.

Many preparers of food, particularly amateurs or average homemakers, face various challenges when preparing meals. For example, the time required for preparing foods by an average or beginner cook is often underestimated, and the amount of actual time spent preparing and cooking a meal is often longer than estimated. Therefore, the time that is available to prepare a meal is too short. This is often the case because time that is needed to prepare a plurality of recipes, for example, in a multi-course meal is not consolidated and/or coordinated in a cookbook. Therefore, the total or accumulated time needed to prepare a meal is not adequately estimated or factored in cookbooks, Internet websites or other providers of recipes.

Another challenge faced by people preparing foods is that a number of variables that may impact meal preparation are unknown to the party providing recipes. For example, the skills of the person preparing the food are not known by the cookbook and/or prior art Internet websites that provide recipes and/or meal suggestions. Further, the types and qualities of various cooking utensils and kitchen appliances are also not known by the cookbook and/or the website. Moreover, and particularly with regard to printed cookbooks, the available food to a person preparing a meal is not known or considered by the author of a cookbook. Further, cookbooks that have an emphasis on a particular season, such as autumn, are not particularly useful or helpful in other seasons. For example, a recipe for a meal to keep warm is inappropriate in a hot, summer month. Further, cookbooks that feature seasonal recipes are not practical or desirable as many ingredients may be either unavailable or not fresh.

Another shortcoming of prior art cookbooks and websites that provide recipe suggestions is that no adequate consideration of the person preparing the food or the person(s) who are going to eat the food is taken into account. For example, taste preferences and food allergies are not taken into consideration in the prior art. Other contextual information, such as the social status of the host and/or guests, is also not taken into consideration, nor does the prior art take into consideration the number of times that a guest has attended a dinner prepared by a host. Other information that is not typically taken into consideration in the prior art regards the complete combination of recipes that may be provided from different sources, such as different cookbooks, websites or the like. A preparer of food runs the risk that individual courses of a complete meal do not fit well together because the sources of recipes for the courses are not known to each other. Conversely, the prior art does not take into consideration combinations of appropriate foods and courses when a plurality of recipe sources are combined or used to prepare a meal.

Another shortcoming of prior art cookbooks and sources of recipes, such as from the Internet, regards stores and shops where ingredients for recipes are located, and prices for ingredients provided thereby. For example, a complex four-course meal may require ingredients from a plurality of stores or shops, each of which may offer the ingredients for the meal at markedly varying prices. Moreover, the locations of the shops are not taken into consideration in the prior art, and a purchaser of the ingredients for a complex meal may ultimately save money by shopping at a store in closer proximity, even though that store may charge slightly more for ingredient(s) than a store that is located farther away.

Although the prior art, including cookbooks, recipe websites, postings in newspapers or the like, provides suggestions for meal courses, shortcomings exist such as those described above, which impede the ability for a host and/or preparer of a meal to provide a meal.

SUMMARY

Systems and methods are provided herein that provide at least solutions or improvements to the prior art, including as described above.

In embodiments, a system and method is provided providing electronic meal information to a user. In these embodiments, one or more processor readable media store at least one database that comprises at least electronic recipe information (including information representing plurality of food recipes), electronic recipe attribute information (including information representing respective attributes of a plurality of ingredients), electronic process information (including information representing processes associated with the plurality of recipes) and electronic time information (including information representing time associated with the processes). Further, one or more processors provide an Internet web site that includes at least a first prompt for submitting food information and a second prompt for submitting available ingredient information. In response to the prompts, the information is received from a user, and electronic meal recipe information is generated b the one or more processors. The electronic meal information corresponds to the food information and the ingredient information, and includes at least one recipe for the meal. Moreover, the one or more processors generate an electronic list of ingredients, wherein the electronic list includes the difference between ingredients in the electronic meal recipe information, and at least one ingredient in the electronic ingredient information, and further wherein the electronic meal information includes selected recipe attributes for the ingredients in the electronic list.

Other features may be provided, including communicating, by the one or more processors, the electronic list to at least one seller of ingredients. In other embodiments, electronic payment information for paying for ingredients is received to purchase from the at least one seller, ingredients identified in the electronic list.

In other embodiments, preferred meal attribute information representing at least one preferred attribute for the meal is received, and used to select at least some of the electronic recipe information that corresponds to the electronic preferred meal attribute information.

In other embodiments, for electronic preparation time information representing a time when the user can make the meal is received from the user, and, as a function of at least some of the electronic process information, at least some of the electronic time information, and the electronic preparation time information, an electronic schedule for performing each of the processes for the meal is generated and provided to the user.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown. The features and advantages of the present invention will become apparent from the following description of the invention that refers to the accompanying drawings, in which:

FIGS. 6-9K illustrate an example data entry display screens for a user to submit information regarding a meal, in accordance with an embodiment;

DESCRIPTION OF THE EMBODIMENTS

Figure 1:
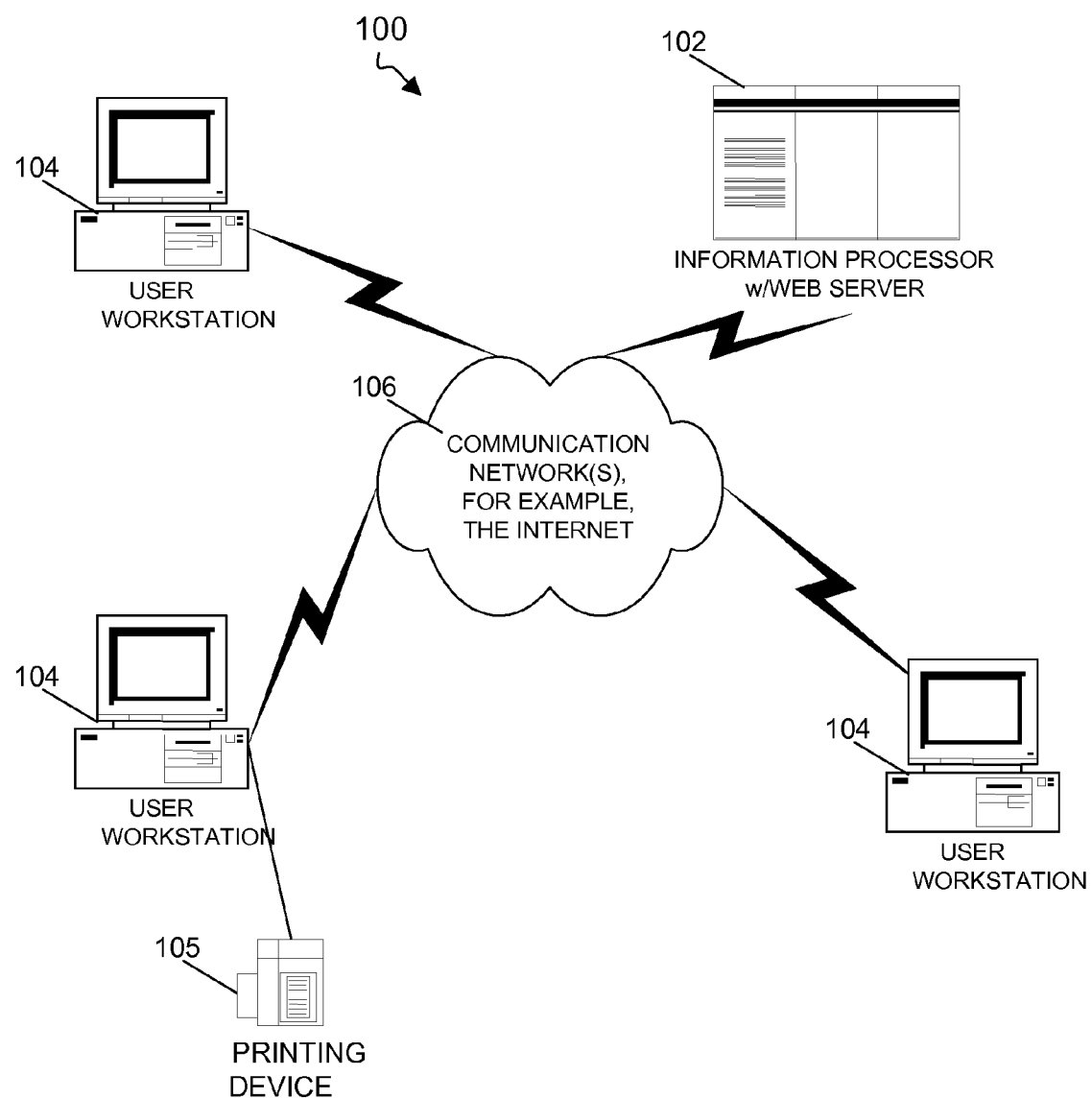
FIG. 1 shows an example hardware arrangement in an embodiment.

The systems and methods provided herein prompt users for various food-related parameters. The parameters received from users are used to select and propose recipes that are stored in one more databases. Information related to the recipes, including ingredients, places and ways to purchase the ingredients, instructions for preparing and cooking courses, and serving meals is provided to users in response to the recipes that are selected by or otherwise provided to users. Moreover, selected recipes may be automatically modified in accordance with the food-related parameters received from users.

Preferably, recipes and corresponding ingredients are retrieved (e.g., captured) and stored in one or more databases in a structured way such that structured data can be selected by an automated or substantially automated process.

In an embodiment, an information processor, such as an Internet web and file server, prompts a user for personal information. For example, a user enters data in a data entry display form representing the user's age, cooking experience, preferred cuisine, and preferred form of payment. The personal information is used by the information processor to build a profile for the user. Additionally, the information processor prompts a user for parameters for a particular meal. For example, a user enters data representing a type of meal, the number of guests or persons who will consume the meal, the date and time of the meal, the amount of time a user has available for preparation and cooking, and cooking equipment at the user's disposal. Moreover, the information processor prompts a user for information regarding ingredients that the user has on-hand or available. For example, the user enters data regarding perishable and non-perishable ingredients and food items the user has in his or her kitchen.

Using the data received from users, the information processor preferably executes electronic instructions to match the user-provided parameters with meal and recipe information stored in the one or more databases. Matched information is retrieved that conforms with the parameters received from the user, including the user's personal profile, the desired type of meal and available ingredients, and the information processor provides one or more recipes, time estimates for preparing and cooking courses associated with the recipes, equipment for preparing and cooking the courses and serving the meal. Calculations may also be made for recommended starting times and dates, and suggestions may be made for places to purchase ingredients. Moreover, an e-commerce component may be provided that facilitates purchasing ingredients for a meal.

In one embodiment, a temporary, trial usage or time period is provided for users to use at least some of the teachings herein at no cost. After the trial period ends, users are prompted to pay a registration fee, which may be a per-use, monthly, semi-annual or annual fee, which entitles the users to access the teachings herein. Other benefits may be provided to registered users, such as coupons that provide discounts or free offers for food at one or more suppliers. In an alternative embodiment, no fees are charged to users, and users are prompted to submit information having value to one or more sponsors. Information submitted by users may be sold to generate revenue for the proprietor of the information processor. Moreover, advertising revenue may be generated by providing banner advertisements or the like on web sites hosted by information processor. Other suitable revenue generating methods are envisioned herein.

Many of the examples and descriptions of the teachings herein regard people who access the information processor, such as over the Internet. Referred to, generally, as "users," people who access the information processor may or may not be the parties who actually prepare, cook serve and/or host meals. For example, a user may access the information processor on behalf of a host (or hostess) of a meal, or may access the information processor on behalf of the person who will actually prepare and cook the meal. For purposes of illustration and readability, the terms, "user," "preparer," "look," and/or "host" refer generally, to any party who uses or benefits from the systems and methods described herein, and/or may be preparing and cooking a meal in accordance with the teachings herein. Thus, the terms are used interchangeably, and the use of these terms is not meant to limit the teachings herein to any one particular context of individual.

Furthermore, many of the descriptions and examples herein include an order of steps that are performed in a particular sequence. It is to be understood that although one or more sequences may be described, the sequences are provided for purposes of example, and that the ordering of steps therein, such as illustrated in a flow chart, are not intended or meant to limit the teachings herein in any way.

Various sources of revenue are envisioned herein. For example, a user is prompted to accept an offer to sign-on, and is charged a annual fee for free usage of the system/software on the web. For example, an annual subscription fee is $35 that provides unlimited access during a one year time period. A second source of revenue may be from banner advertisements. For example, a grocer pays a yearly fee for banner advertisements that appear, such as on an Internet home page, as known in the art. A third source of revenue may be from a margin on a turnover that a delivering grocer generates from a menu-tool that prompts users for electronic food orders. For example, a percentage of an order for food is charged to a grocer or other seller of foods. Thus, income may be generated as a function of the teachings herein.

Referring to the drawings, in which like reference numerals refer to like elements, FIG. 1 shows an example hardware arrangement in an embodiment and referred to generally as system 100. In the embodiment shown in FIG. 1, system 100 comprises at least one information processor 102 (configured to operate as an Internet web server and database file server) programmed and configured to access communication network 106 and communicate with user workstation(s) 104. User workstations 104 and information processor(s) 102 communicate via the known communications protocol, Transmission Control Protocol/Internet Protocol "TCP/IP." In this way, content can be transmitted to and from the devices 102 and 104, and commands can be executed to enable the various functions described herein.

As used herein, the term, "module" refers, generally, to one or more discrete components that contribute to the effectiveness of the teachings herein. Modules can operate or, alternatively, depend upon one or more other modules in order to function.

Information processors 102 and user workstation 104 are any devices that are capable of sending and receiving data across communication network 106, e.g., mainframe computers, mini computers, personal computers, laptop computers, a personal digital assistants (PDA) and Internet access devices such as Web TV. In addition, information processors 102 and user workstation 104 may be equipped with a web browser, such as MICROSOFT INTERNET EXPLORER, NETSCAPE NAVIGATOR, MOZILLA FIRREFOX or the like. Thus, as envisioned herein, information processor 102 and/or user workstation 104 are devices that can communicate over a network and can be operated anywhere, including, for example, moving vehicles.

The nature of the teachings herein is such that one skilled in the art of writing computer executable code (i.e., software) can implement the described functions using one or more of a combination of popular computer programming languages and developing environments including, but not limited to C, C++, Visual Basic, JAVA, PHP, HTML, XML, ACTIVE SERVER PAGES, JAVA server pages, servlets, and a plurality web site development applications.

For example, data may be configured in a MICROSOFT EXCEL spreadsheet file, as a comma delimited ASCII text file, as a MICROSOFT SQL SERVER compatible table file (e.g., MS-ACCESS table), or the like. In another embodiment, data may be formatted as an image file (e.g., TIFF, JPG, BMP, GIF, or the like). In yet another embodiment, data may be stored in an ADOBE ACROBAT PDF file. One or more data formatting and/or normalization routines may be provided that manage data received from one or a plurality of sources. In another example, data are received that are provided in a particular format (e.g., MICROSOFT EXCEL), and programming routines are executed that convert the data to another format (e.g., ASCII comma-delimited text or XML).

It is contemplated herein that any suitable operating system can be used on user workstations 104 and information processor 102, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, WINDOWS VISTA, MAC OS, UNIX, LINUX, PALM OS, POCKET PC or any other suitable operating system. Of course, one skilled in the art will recognize that other software applications are available in accordance with the teachings herein, including, for example, via JAVA, JAVA Script, Action Script, Swish, or the like.

Moreover, a plurality of data file types is envisioned herein. For example, various suitable multi-media file types are supported, including (but not limited to) JPEG, BMP, GIF, TIFF, MPEG, AVI, SWF, RAW or the like (as known to those skilled in the art).

Figure 2:
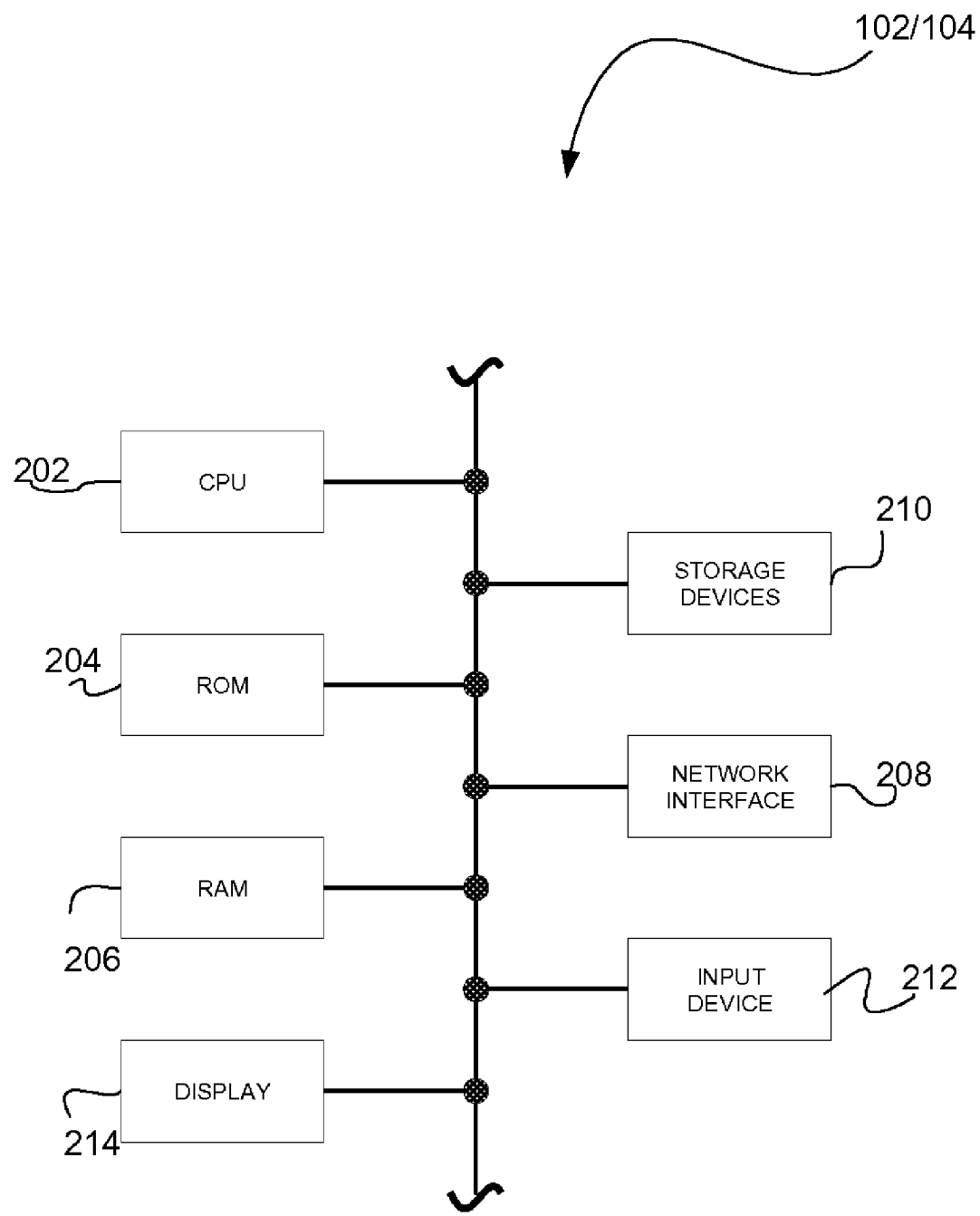
FIG. 2 illustrates the functional elements of user workstation and/or information processor in an embodiment.

FIG. 2 illustrates example functional elements of user workstation 104 and/or information processor 102 and that include one or more central processing units (CPU) 202 used to execute software code and control the operation of computing devices 102/104, read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code, databases and application data, one or more input devices 212 such as a keyboard, mouse, track ball, microphone and the like, and a display 214.

The various components of information processor 102 and/or user workstation 104 need not be physically contained within the same chassis or even located in a single location. For example, storage device 210 may be located at a site which is remote from the remaining elements of information processor 102 or user workstation 104, and may even be connected to CPU 202 across communication network 106 via network interface 208. Information processor 102 includes a memory equipped with sufficient storage to provide the necessary databases, forums, and other community services as well as acting as a web server for communicating hypertext markup language (HTML), FLASH, Action Script, Java, Active Server Pages, Active-X control programs on user workstation 104. Information processors 102 are arranged with components, for example, those shown in FIG. 2, suitable for the expected operating environment of information processor 102. The CPU(s) 202, network interface(s) 208 and memory and storage devices are selected to ensure that capacities are arranged to accommodate expected demand.

In a preferred embodiment, a system and method are provided that enable interactive exchange of information between users, such as via an Internet web site provided on information processor 102. For example, a text box, drop down list, bullet list, or other graphical screen control is provided for the user to submit information. Other familiar input techniques are provided, including but not limited to verbal commands which are received by a system module, which may be converted by another system aspect to be recognizable, sortable data.

Figure 3A:
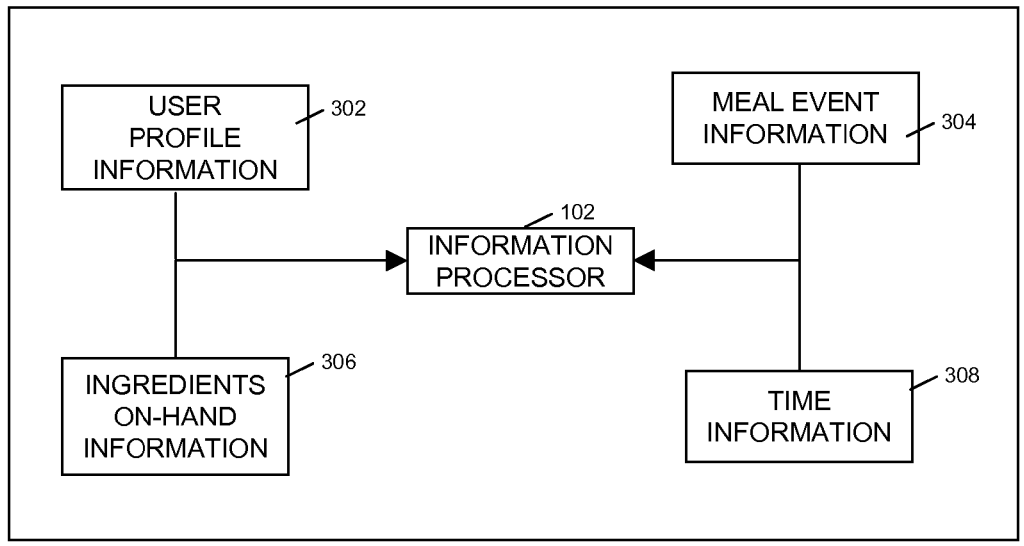
FIG. 3A is a block diagram of data elements that are received from a user in an embodiment.

FIG. 3A is a block diagram that illustrates example categories of information that are received from a user workstation 104 in response to one or more prompts provided by information processor 102. In a preferred embodiment, information processor 102 provides data entry display screens accessible via web browser applications and over the Internet. As shown in FIG. 3A, user profile information 302, meal information 304, ingredients on hand information 306 and date/time information 308 are received, which are used by information processor 102.

User Profile Information

In connection with user profile information 302, a user preferably submits personal information, such as demographic information, as well as personal cooking skill level information representing the ability of the user to prepare, cook and serve food. In one embodiment, the user identifies whether he has professional, semi-professional or amateur experience cooking. The user may further indicate a degree of particular experience, such as the amount of professional experience a user has, whether the user is a gourmet chef, places where a user worked or the like. The user may also submit information identifying types of cuisine that the user has prepared and cooked. Using the information 302 submitted by the user, appropriate recipes are selected and provided by information processor 102. For example, a person having a medium level of food preparation (hereinafter "prepping") and cooking experience is provided with recipe selections that are more challenging than a person with a beginner level of skills. In one embodiment, a user may select an override or other control to request that information processor 102 provide more or less challenging recipes than the user's profile would otherwise indicate.

Other user profile information 302 relates to the amount of money that a user is willing to spend for a meal. Food and recipe selections may be provided by information processor 102 that correspond to a person's respective financial means. In addition to selecting recipes identified by information processor 102 based on expected cost, lower priced ingredients may be substituted for higher priced ones to enable otherwise expensive meals to be prepared and served at more modest prices.

Thus, and as described above, user profile information 302 represents particulars about a user, and information processor 102 preferably selects and/or modifies recipes from databases that match the user profile information 302.

Meal Event Information

Continuing with reference to FIG. 3A, meal event information 304 represents information for a particular meal event, such as a dinner party. Information representing a meal, such as the kind of meal (e.g., dinner, brunch, lunch, barbeque or the like), the date and time of a meal, the number and names of guests who are attending a meal, or the like is preferably received from users. Recipes that match the meal event information 304 are selected and presented to users. For example, brunch menu selections are recommended for a meal that begins at 11:00 a.m., while dinner menu recommendations are provided for a meal that beings at 8:00 p.m. Also, meal suggestions are made that are appropriately seasonal.

Based upon meal information 304 that is received from a user, information processor 102 distinguishes between a meal that is informal, such as a casual meal among friends, from a formal meal. Accordingly, information processor 102 may make suggestions relating to ancillary details of meal, such as a respective wine selection or the seating arrangement and order of the guests. In one embodiment, information processor 102 accesses a database of invitations and provides a selection of invitation formats for users to order and/or print invitations to be mailed to guests. Personalized invitations can be made by users via interactive data entry display screens provided by information processor 102. Moreover, meal event information 304 submitted by a user is preferably stored in one or more databases for future reference. Information processor 102 may reference previously received meal information 304 from a user and appropriate menu or recipe selections are made in accordance therewith.

Further, in a preferred embodiment, combinations of recipes and ingredients are taken into consideration by information processor 102 that are appropriate for a complete meal, particularly in connection with meal event information 304. For example, information processor 102 may not recommend serving a combination of starches, such as corn, rice and potatoes in a single meal. In another example, two or three different soups may not be recommended for a meal. Thus, certain combinations of ingredients and/or recipes are preferably excluded or included to ensure that individual courses fit well together in a meal. In this way, a meal faux pas can be avoided, such as serving fish for an appetizer and again for a main course, serving two recipes, each containing a cream sauces, or serving two or more recipes that have strong aroma, which interfere with each other or with other courses.

Meal event information 304 may also include feedback that is submitted by the user regarding various elements of a completed meal. Preferably, details are provided by the user that identify many aspects of the meal, including details regarding preparation of each of the recipes (e.g., times, quality, unexpected conditions, successes or the like), the level of enjoyment of the recipes by the guests (e.g., respective guests' likes and dislikes of the various courses), various substitutions of ingredients and whether the substitutions were successful. The feedback information provided by the user is preferably stored in one or more databases, and referenced in the future by information processor 102 to draw conclusions about the preparer, the meal, the guests, or other variables and/or combinations thereof. For example, a particular side dish was identified as being highly enjoyed. In response, a future recipe suggestion may be made by information processor 102 to the same host and/or preparer for that side dish, even when future guest profile information submitted by a user identifies one or more of the same guests attending another meal. In other words, since the guests once enjoyed a particular side dish, the information processor suggests that same side dish be served again. Alternatively, different menu and/or recipe suggestions are made to avoid redundancy in meal selection and preparation. Other meal event information 304 received from a user may relate to ethnic, regional, personal preferences and allergies of one or more consumers (e.g., guests). Information processor 102 preferably factors meal event information 302 to select and recommend recipes, courses and complete meals to users.

For example, a user submits user profile information 304 to information processor 102 that he possesses an intermediate level of skill in food preparation, and cooking. Information processor 102 determines, based on the user's feedback, that foods took substantially longer to prepare, were not prepared correctly, and, accordingly, information processor 102 modifies the user's skill level from intermediate to beginner. Moreover, information processor 102 may change a user's skill level from beginner to intermediate after a relatively challenging recipe or meal is successfully prepared. It is recognized by the inventor that successful preparation of foods is a motivating factor in improving one's food preparation skill level.

Ingredients On-Hand Information

Continuing with reference to FIG. 3A, ingredients on-hand information 306 is received from a user that represents ingredients that a user has available for a meal. In a preferred embodiment, recipes are selected and recommended that correspond to available food that a user has, particularly with respect to pending expiration dates thereof. Information representing food and/or ingredients that are available to a user is used by the information processor to recommend recipes and meals that include those ingredients. The information representing ingredients available is preferably also used to determine other ingredients that may be included in a particular meal.

As noted above, information representing available ingredients, foods, equipment and appliances is preferably transmitted to the information processor. For example, a user identifies that she has chicken with an expiration date of tomorrow, red and green fresh peppers, and boiled rice. The information processor uses the information received from the user, and selects recipes in the database that match those parameters. Accordingly, only recipes having those ingredients and that are consistent with previously stored profiled information regarding the user or the food preparer are made.

Time Information

Time information 308 received from users represents time that preparers have to prepare and cook a meal. In an embodiment, recipes are provided or selected by information processor 102 that conform with time restrictions or requirements. For example, a user uploads information identifying a twenty-minute maximum time limit and a list of foods that are on-hand and are available to the user at the time. The information processor accesses one or more databases and selects recipes that require twenty-minutes to prepare. Thereafter, information processor 102 narrows the list of available recipes for foods that are on-hand.

Accordingly and as described above, meal event information 304 represents particulars about a planned or completed meal, and information processor 102 preferably makes meal-related selections from databases that relate to the meal event information 304.

Figure 3B:
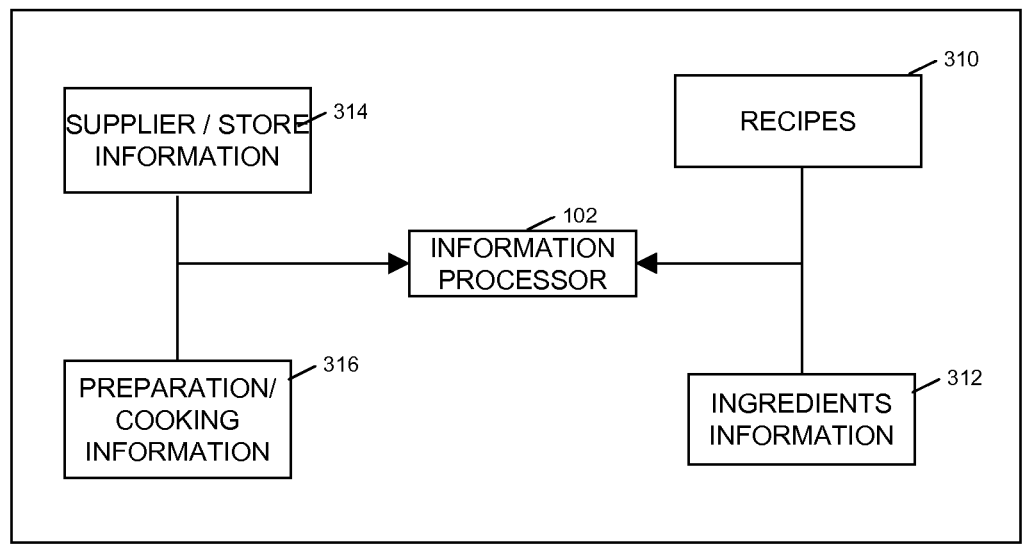
FIG. 3B is a block diagram illustrating data elements that are received from one or more databases accessed by an information processor, in an embodiment.

FIG. 3B is a block diagram illustrating information stored in one or more databases and accessed by information processor 102 in accordance with a preferred embodiment. In the example shown in FIG. 3B, recipe information 310 includes information representing a plurality of recipes. Example recipe information 310 may include information regarding categories of recipes, ingredients, preparation instructions, cooking instructions, time requirements and the like. Recipe information also preferably includes attributes that identify characteristics of the meal, such as relating to allergies, diet restrictions or the like.

In addition to recipe information 310, ingredients information 312 includes information representing ingredients that are used in recipes. For example, ingredient information 312 may include identifications of ingredients, a description of how ingredients taste, the origins of ingredients (e.g., vegetable, animal, mineral), whether an ingredient is natural or synthetic, elements of ingredients (e.g., cheese is made from a dairy product), possible allergic reactions to ingredients or the like. Ingredients information 312 may also identify ingredients that may be substituted for other ingredients, such as vinegar for lemon juice.

Continuing with reference to FIG. 3B, supplier/store information 314 represents suppliers of ingredients and foods. For example, stores, shops, produce providers, including wholesalers and retailers, provide information 314 that is accessible to information processor 102. In an embodiment, information processor 102 maintains connectivity to a plurality databases maintained by suppliers of ingredients and foods. As a user selects a recipe, information processor 102 preferably accesses one or more databases storing supplier/store information 314, identifies ingredients and orders the food for the user. Accordingly, an e-commerce food shopping system and method is provided for users to obtain ingredients for recipes included in meal suggestions provided by information processor 102. A direct ordering process may be provided with contractors based on a shopping list that is defined by ingredients identified by information processor 102 for a user to prepare and cook one or more meals.

As noted above in connection with FIG. 3A, information processor 102 receives ingredients information 306 representing food and ingredients that are available to a user. Preferably, information processor 102 determines the difference between ingredients required for a meal and ingredients that the user currently has. Preferably, only those ingredients that a user does not already have are selected for an abbreviated shopping list. Moreover, information processor 102 preferably accesses supplier/store information 314 to identify convenient and economical choices for obtaining those ingredients. For example, stores that sell the ingredients at the lowest price, or are in the most convenient locations, are selected by the information processor for the user. Moreover, information processor 102 uses supplier information 102 to enable users to purchase the ingredients online (e.g., over the Internet) and, thereafter, users can simply travel to the stores or other locations where the ingredients are located, and pick up the prepaid ingredients. Supplier/store 314 information may also enable information processor 102 to provide directions for users to respective stores and/or locations where food and/or ingredients are to be obtained.

Information processor 102 preferably functions as an interface for identifying appropriate recipes and meal selections for users, and for ingredients from purchasing sources, in accordance with user requests and profiles. Information processor 102 takes into consideration the prices for food and ingredients, and may make alternative food suggestions based upon price, convenience, availability, user skill level, and the like. Information processor 102 receives information related to a user's personal data, payment information, and cooking experience in response to prompts provided to the user. The user also submits payment information, such as credit card, PAYPAL or other payment data In addition to recipe information 310, ingredients information 312 and supplier/store information 314, preparation/cooking information 316 is preferably matched and accessed by information processor 102. Information 316 is preferably provided for users that represents steps associated with preparing and cooking food, as well as calculations of times for preparing and cooking, as well as recommended starting times and days for preparing and cooking food.

Figure 3C:
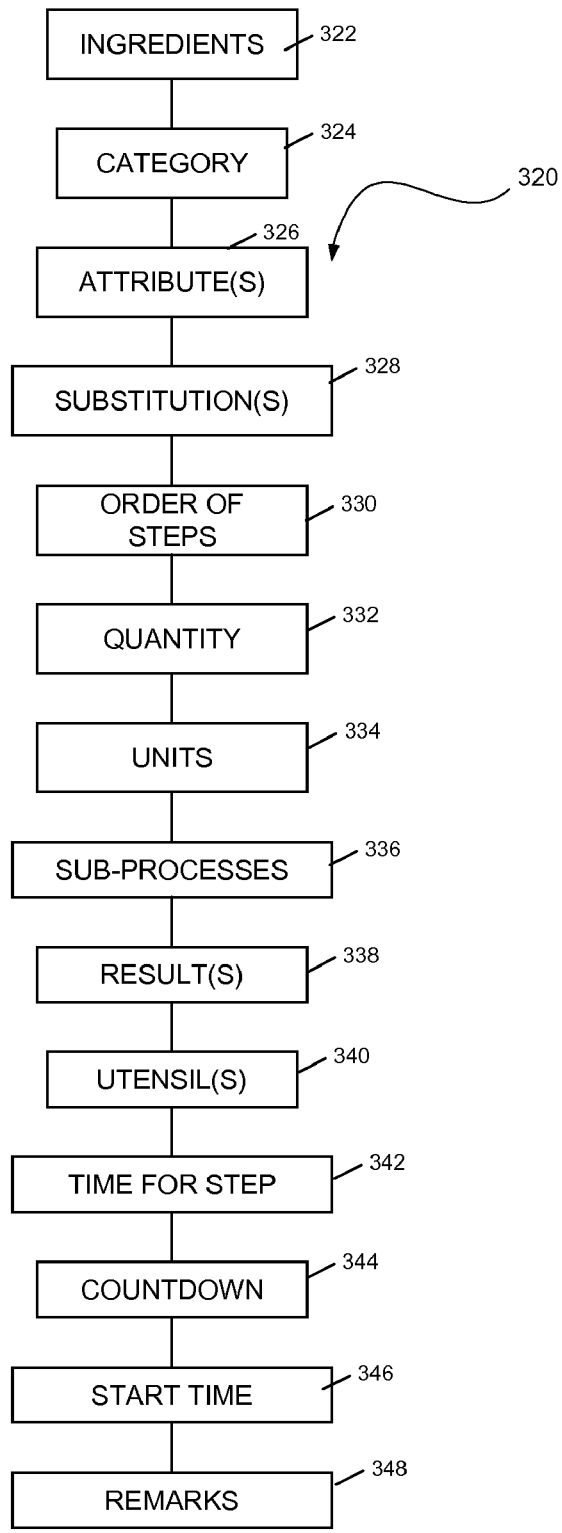
FIG. 3C is a block diagram of data elements that are provided to a user in an embodiment.

FIG. 3C is a block diagram of categories or kinds of data elements that are provided to a user in an embodiment. Substantially as described herein, once one or more of user profile information 302, meal event information 304, ingredients on-hand information 306 and/or time information 308 are received from the user, information processor 102 searches for and/or locates matching or correlating information stored in one or more databases and, as appropriate, modifies the information retrieved from the database(s) to comply with the various parameters and preferences submitted by the user.

Continuing with reference to FIG. 3C, information processor 102 provides information related to ingredients 322, which are the respective ingredients called for by the recipe. Category information 324 relates to a general categorization of the recipes, such as meat, dairy, vegetable or the like. Attributes 326 relate to details for the meal and/or respective ingredients therefor. Preferably, any number of attributes 326 is supported by information processor 102. For example, an attribute of an ingredient containing meat is that the ingredient and, by extension the recipe itself, is not suitable for vegetarians. Other examples of attributes are that a recipe is not suitable for children, a recipe is not low-fat, a recipe contains caffeine, a recipe contains nuts or the like. In a preferred embodiment, a plurality of attributes can be provided for any single ingredient and/or recipe.

Continuing with reference to FIG. 3C, substitutions 328 identify one or more ingredients that can be substituted for an ingredient called for by the recipe. For example, vinegar may be substituted for lemon juice, or olive oil may be substituted for butter. Order of steps 330 identifies the order in which particular steps for one or more recipes should (but not necessarily must) occur. In an embodiment, information processor 102 supports a plurality of recipes for a multi-course meal, and a benefit of the teachings herein is that the ingredients and order of steps for prepping and cooking a plurality of recipes in connection with a meal are provided to the user. This promotes a far greater efficiency and ease for preparing complicated meals than was previously available in the prior art.

Continuing with reference to FIG. 3C, quantity 332 represents the amount of ingredients for one or more recipes. Similarly, units 334 identify quantities of ingredients. For example, quantities are provided in terms of volume (teaspoons, tablespoons, milliliters, cups, pints or the like), or weight (grams, ounces, etc.). In one embodiment, a user identifies in his/her profile a desired measurement standards, such as the metric system. Preferably, an automated calculation of the total quantity needed of recipes, according to the number of persons and the needed quantity per person, is made. Moreover, the selection and proposals of ingredients in according with recipes proposed by information processor 102 take into consideration ingredients that are currently available to the user.

Sub-processes 336 identify one or more steps that are to be performed in connection with prepping or cooking any one or more of the ingredients. For example, onions are sautéed for twelve minutes, removed from the sauté pan, and then rolled in flour. Other examples of sub-processes 336 include using a blender for ingredients for a period of time, leeching eggplant for three hours, and letting for dough rise for two hours.

Results 338 represent the expected outcome of a particular sub-process 336. For example, leeched eggplant will result in all seeds being removed from the eggplant. Sautéed onions will shrink, and will be braised lightly brown. Utensils 340 represent respective utensils that are to be used for ingredient(s) and during one or more sub-processes 336. Time for step 342 represents the amount of time a particular step is expected to require. Countdown 344 represents a decreasing running of time, for example, in minutes, until the expected completion time of one or more recipes. Start time 346 identifies a projected time when a particular sub-process 336 or step is scheduled to begin. Remarks 348 represents remarks or comments provided by information processor 102 or submitted to information processor 102 in connection with a sub-process 336, or a recipe or meal, more generally. In an example embodiment, a report is delivered to the user that is a working-plan sorted according to the day and/or time to start.

Figure 4:
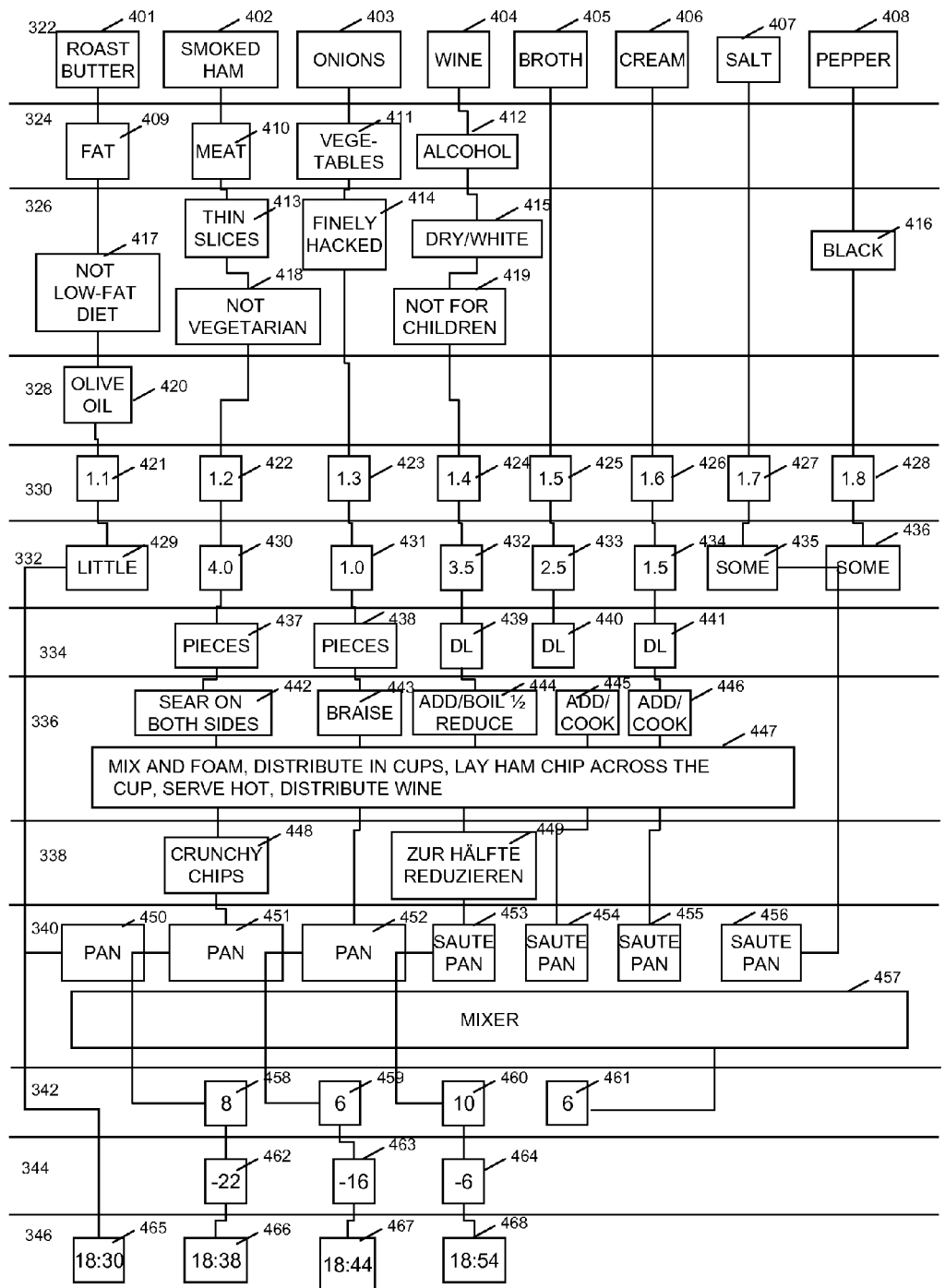
FIG. 4 is an example data that are returned for preparing a recipe in accordance with an embodiment.

FIG. 4 is a block diagram showing example data that are returned for preparing a recipe in accordance with an embodiment. In the example shown in FIG. 4, information processor 102 has provided a recipe for Wine Foam Soup with Land Smoked Ham. Preferably, information processor 102 is operable to provide a plurality of recipes, including information for preparing the recipes. Preferably, the information may be formatted in various ways, including textual and multi-media formats, such as audio, video, and still images.

In connection with FIG. 4, ingredients 322 values include "roast butter" 401, "smoked ham" 402, "onions" 403, "wine" 404, "broth" 405, "cream" 406, "salt" 407 and "pepper" 408, which are included in the recipe. The categories 324 values of the ingredients 322 include "fat" 409 (for roast butter 401), "meat" 410 (for ham 402), "vegetables" 411 (for onions 403) and "alcohol" 412 (for wine 404). Attributes 326 values include "thin slices" 413 (for ham 402), "finely hacked" 414 (for onions 403), "dry/white" 415 (for wine 404), "black" 416 (for pepper 408), "not low-fat diet" 417 (for roast butter 401), "not vegetarian" 418 (for ham 402) and "not for children" 419 (for wine 404). Substitutions 328 values include "olive oil" 420 for roast butter 401.

Continuing with reference to FIG. 4, order of steps 330 are shown for the respective ingredients. In the example shown in FIG. 4, roast butter 401, smoked ham 402, onions 403, wine 404, broth 405, cream 406, salt 407 and pepper 408 are performed in steps "1.1" 421, "1.2" 422, "1.3" 423, "1.4" 424, "1.5" 425, "1.6" 426, "1.7" 427 and "1.8" 428, respectively. Quantity 332 values for the ingredients 322 include "little" 429 (for roast butter 401), "4.0" cups 430 (for smoked ham 402), "1.0" cups 431 (for onions 403), "3.5" cups 432 (for wine 404), "2.5" cups 433 (for broth 405), "1.5" cups 434 (for cream 406) and "some" 435 and 436 (for salt 407 and pepper 408). Units 334 values for the ingredients 322 include "pieces" 437 and 438 (for smoked ham 402 and onions 403), and deciliter ("DL") 439, 440 and 441 (for wine 404, broth 405 and cream 406).

Continuing with reference to FIG. 4, values for sub-processes steps 336 include "sear on both sides" 442 (for smoked ham 402), "braise" 443 (for onions 403), "add/boil/reduce" 444 (for wine 404) and "add/cook" 445, 446 (for broth 405 and cream 406). Moreover, and not in connection with any one ingredient, sub-process 336 includes "mix and foam, distribute in cups, lay ham chip across the cup, serve hot, and distribute wine" 447 in connection with the recipe, more generally.

Example results 338 values, shown in FIG. 4, include "crunch chips" 448 (for smoked ham 402), and "Zur Hälfte Reduzieren" 449 (for wine 404). Example utensils 340 value include "pan" 450, 451 and 452 (for roast butter 401, smoked ham 402 and onions 403), and "sauté pan" 453, 454, 455 and 456 (for wine 404, broth 405, cream 406 and salt 407). Moreover, and not in connection with any one ingredient, utensils 340 values also include "mixer" 457, in connection with the recipe, more generally.

Continuing with reference to FIG. 4, time for step 342 identifies the number of time units, such as minutes, for respective steps and sub-processes for one or more recipes. In the example shown in FIG. 4, example times for steps 342 include "8" minutes 458 (for smoked ham 402), "6" minutes 459 (for onions 403), "10" minutes 460 (for wine 404) and "6" minutes 461 for blending the ingredients, prior to serving. Example countdown 344 values include "−22" minutes 462 (for smoked ham 402), "−16" minutes 463 (for onions 403) and "−6" minutes 464 (for wine 404). Example start time 344 values include "18:30" 465 (for roast butter 401), "18:38" 466 (for smoked ham 402), "18:44" 467 (for onions 403) and "18:54" 468 (for wine 404). Thus, and as demonstrated in FIG. 4, information processor 102 provides recipe, purchasing, preparation, cooking and/or serving information for one or more recipes that relates directly and indirectly to parameters provided by a user in response to prompts by information processor 102.

FIGS. 5-9 are example data entry display screens that include prompts for users to submit information to information processor 102. The information received by information processor 102, such as shown in FIGS. 5-9, is used to provide information, such as discussed herein and described above with reference to FIGS. 3C and 4.

Figure 5:
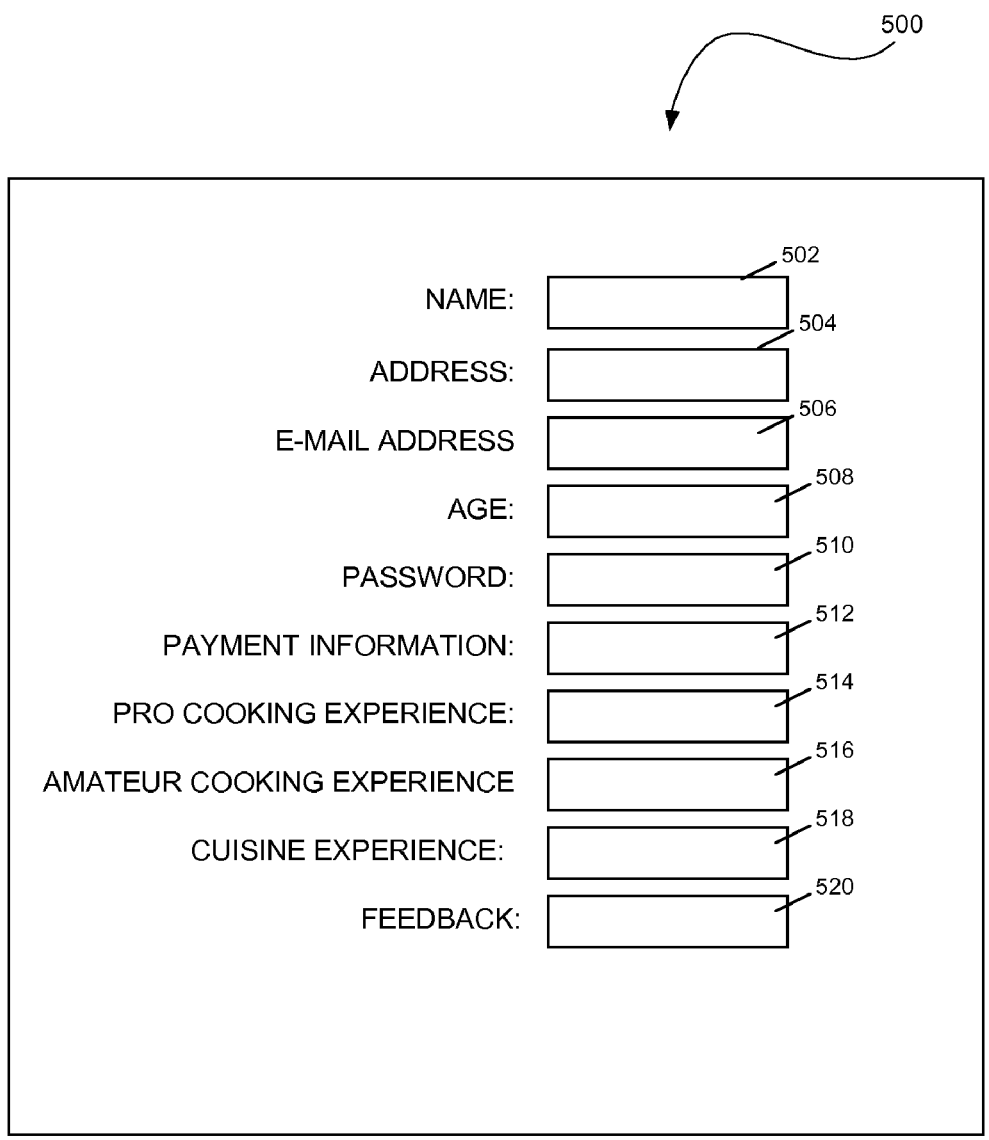
FIG. 5 illustrates an example data entry display screen for a user profile accordance with an embodiment.

FIG. 5 is an example data entry display screen 500 that is useful for an individual to supply user "profile" information. In the example shown in FIG. 5, the user submits contact and demographic information, such as name 502, address 504, e-mail address 506 and age information 508. Further, the user preferably defines a password 510, and submits payment information 512. Moreover, the user preferably identifies cooking experience, such as whether the user has professional cooking experience 514, amateur cooking experience 516, whether the user has experience with one or more particular cuisines 518 (e.g., Mediterranean). The user also submits feedback information 520. For example, a user may submit a general, summarizing remark, such as fully satisfied, satisfied, partially satisfied and not satisfied.

Thus, information, such as shown in the example data entry display screen 500, is useful for information to identify an individual in connection with the teachings herein.

FIG. 6 is an example data entry display screen 600 that is useful for an individual to supply meal plan information to information processor 102. In the example shown in FIG. 6, the user submits details of a forthcoming meal, such as type of meal 602, number/types of guests 604, date/time of the meal 606, location of meal 608, type of cuisine 610, food preferences 612 and allergies/dislikes 614. Using the information received from FIG. 6, information processor 102 preferably searches for matching recipe and meal information stored in one or more databases, and provides recipe and meal information for users to prepare food in accordance therewith.

FIG. 7 is an example data entry display screen 700 that is useful for an individual to supply available ingredient information 702-716. With reference to the recipe(s) provided by information processor 102 in connection with information received, for example, in FIG. 6, information processor 102 determines one or more ingredients that a user still needs, in view of the available ingredients provided, such as in data entry display screen 700. For example, a delta calculation is performed that represents the difference between ingredients called for by one or more recipes, and the ingredients that are available to the user.

Figure 8:
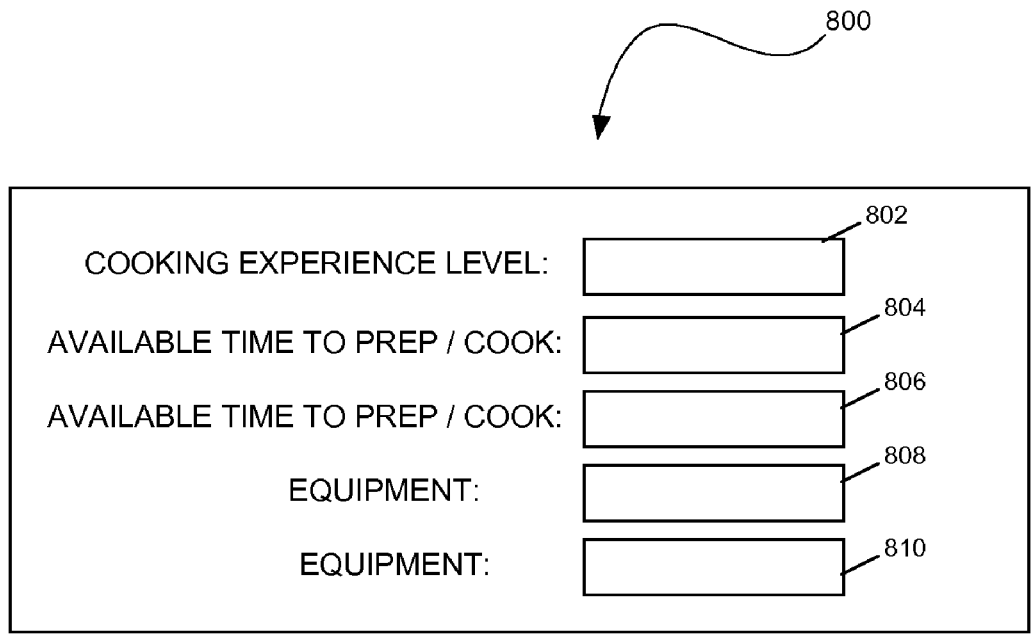

FIG. 8 is an example data entry display screen 800 that is useful for an individual to supply additional information regarding the meal. For example, the individual submits the cooking experience skill level of the preparer 802, the available time for prepping and cooking the meal 804, 806. Further, the user submits information relating to available equipment 808, 810.

Figure 9:
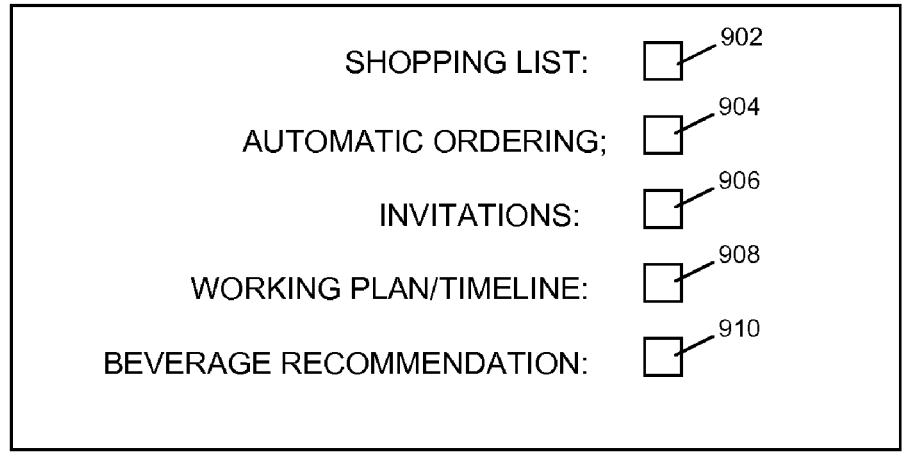

FIG. 9 is an example data entry display screen 900 that includes a plurality of data entry graphical screen controls (e.g., checkboxes) that are useful for an individual to select one or more options provided by information processor 102 in connection with the teachings herein. For example, options are provided for a user to select a shopping list 902, automatic ordering 904, invitations 906, meal working plan/timeline 908 and/or beverage recommendation 910.

Using the information submitted in FIGS. 3-8, and selections of options, such as provided in FIG. 9, information processor 102 outputs information to the user in one or more various formats, and that is useable by the user to prepare and cook one or more recipes for a single or multi-course meal.

FIGS. 9A-9K illustrate example data entry display screens that are provided for users to select options related to food that is available to the user, user profile information, meal event information and available food preparation/cooking time information. Graphical screen controls, such as radio buttons, drop down lists, text boxes, checkboxes or the like, are provided for users to make selections that correspond to options shown in the screens. The display screens illustrated in FIGS. 9A-9K represent one embodiment and example for data entry, as envisioned herein. Other mechanisms, including other kinds of data entry graphical screen controls and possible options are envisioned herein and may be provided in alternative embodiments.

Figure 9A:
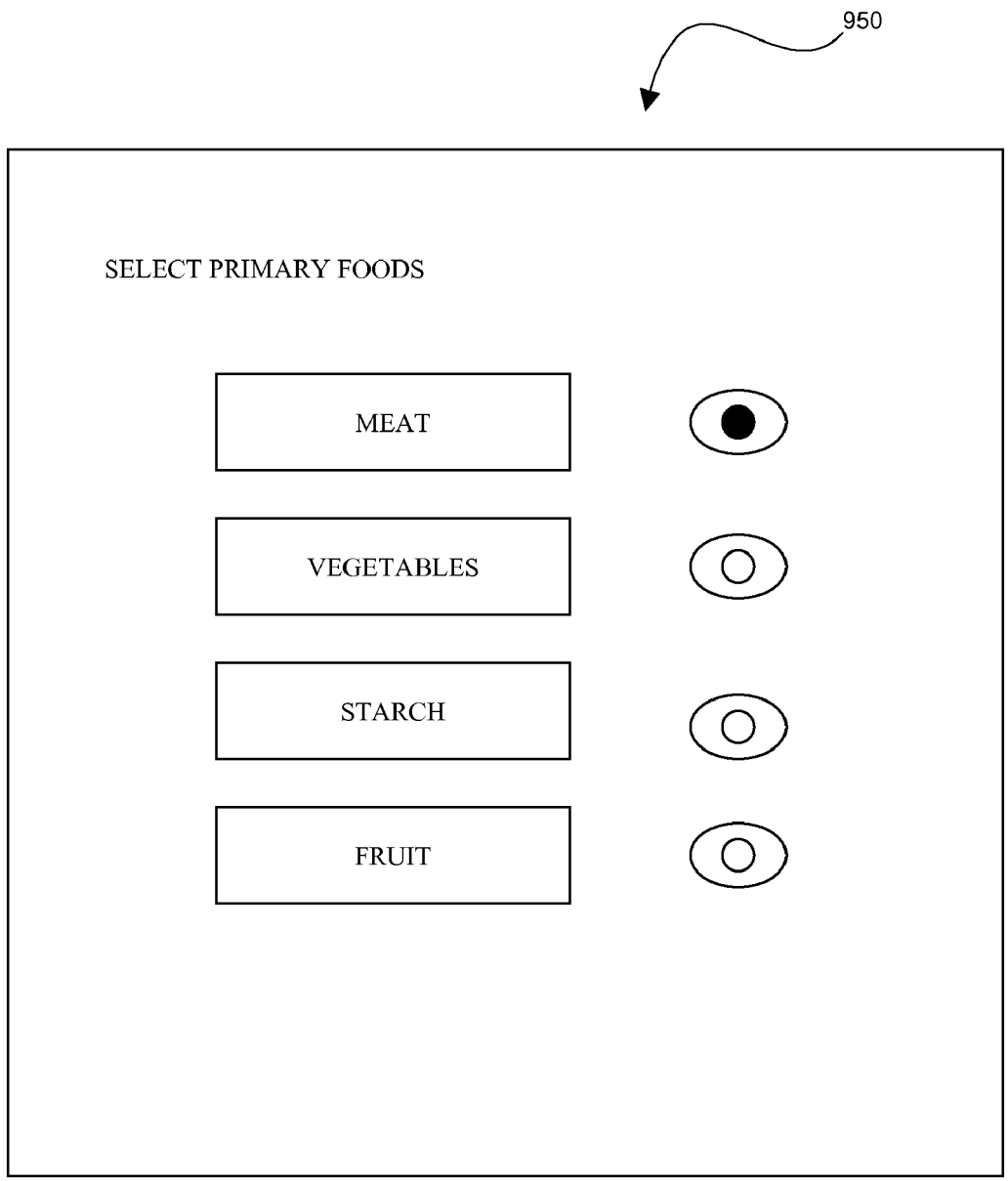
Figure 9B:
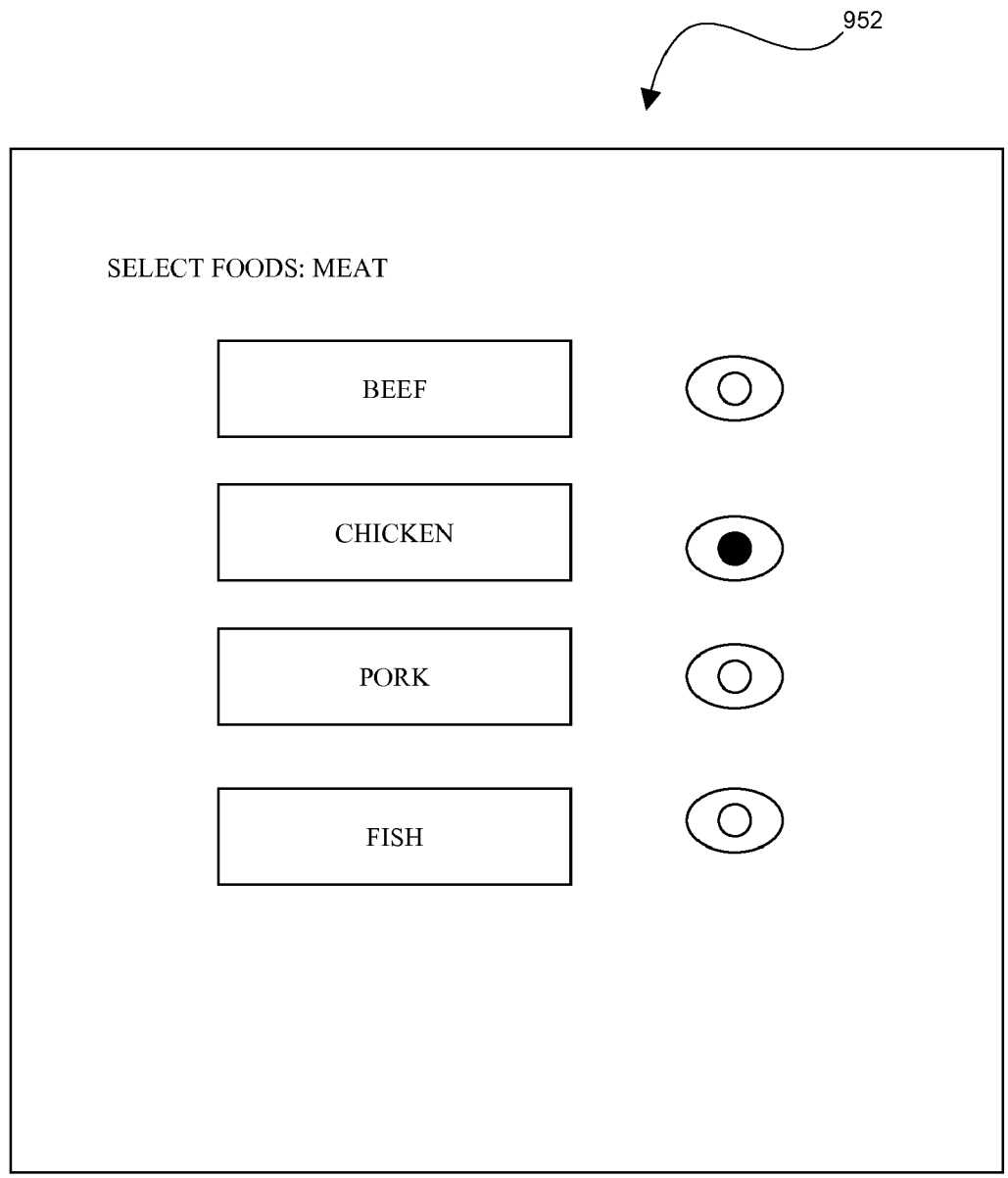
Figure 9C:
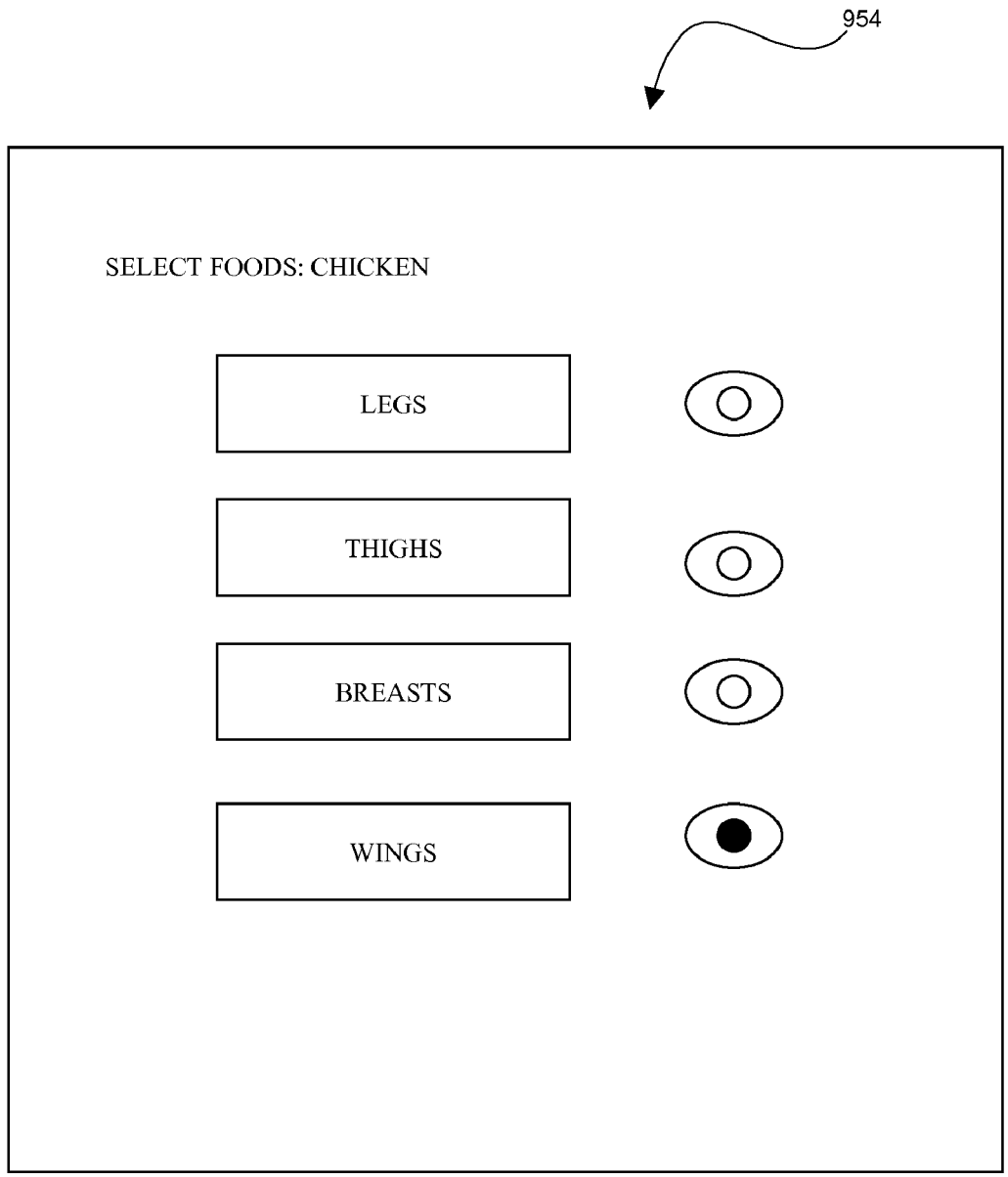

FIG. 9A illustrates an example display screen 950 for a user to select ingredients on-hand information 306. In the example shown in FIG. 9A, the user has options to select meat, vegetables, starch and fruit. In example display screen 952 shown in FIG. 9B, the user is provided with options for meat, previously selected from screen 950, which include beef, chicken, pork and fish. In example display screen 954 shown in FIG. 9C, the user is provided with options for chicken, previously selected from screen 952, which include legs, thighs, breasts and wings.

Figure 9D:
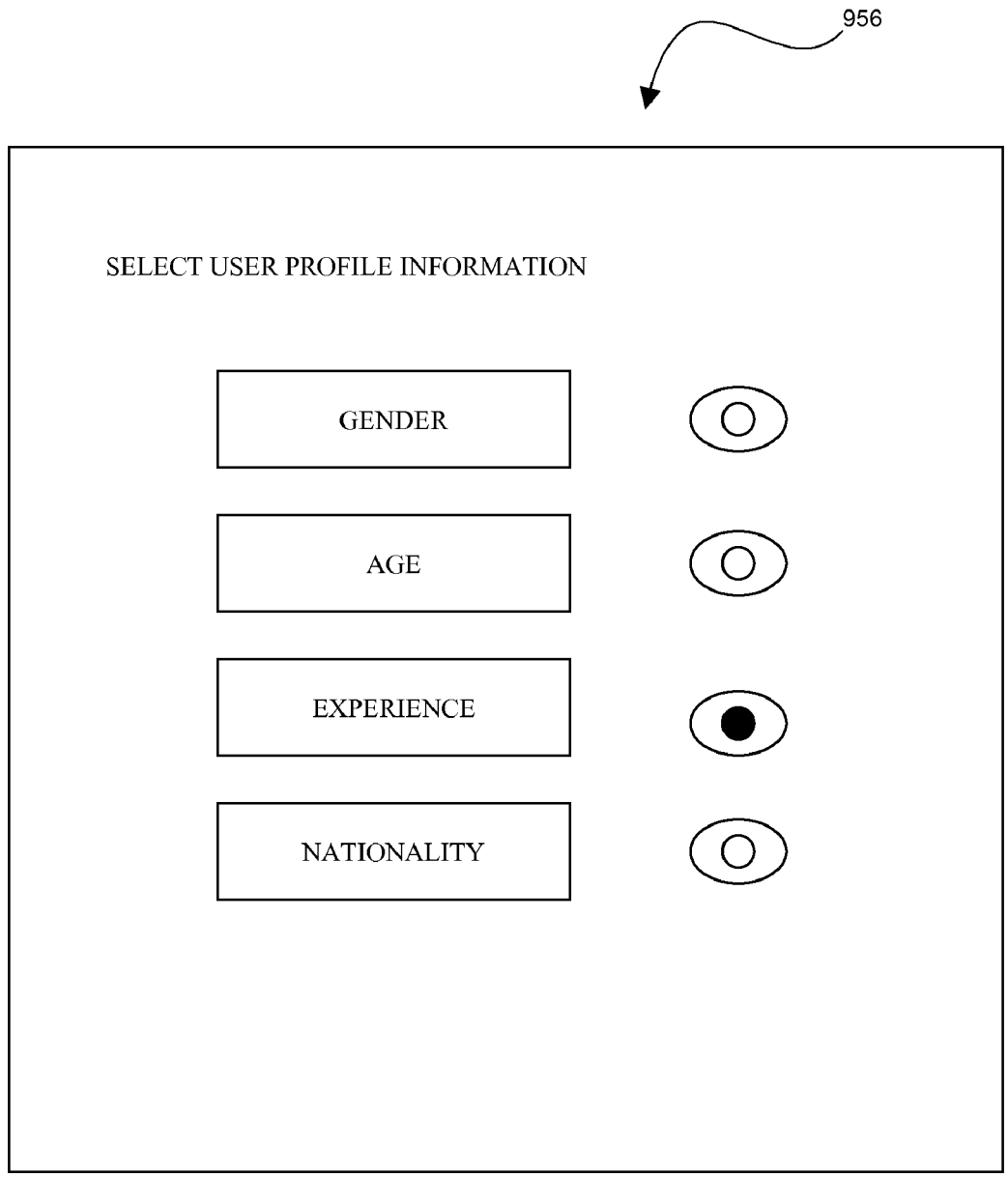
Figure 9E:
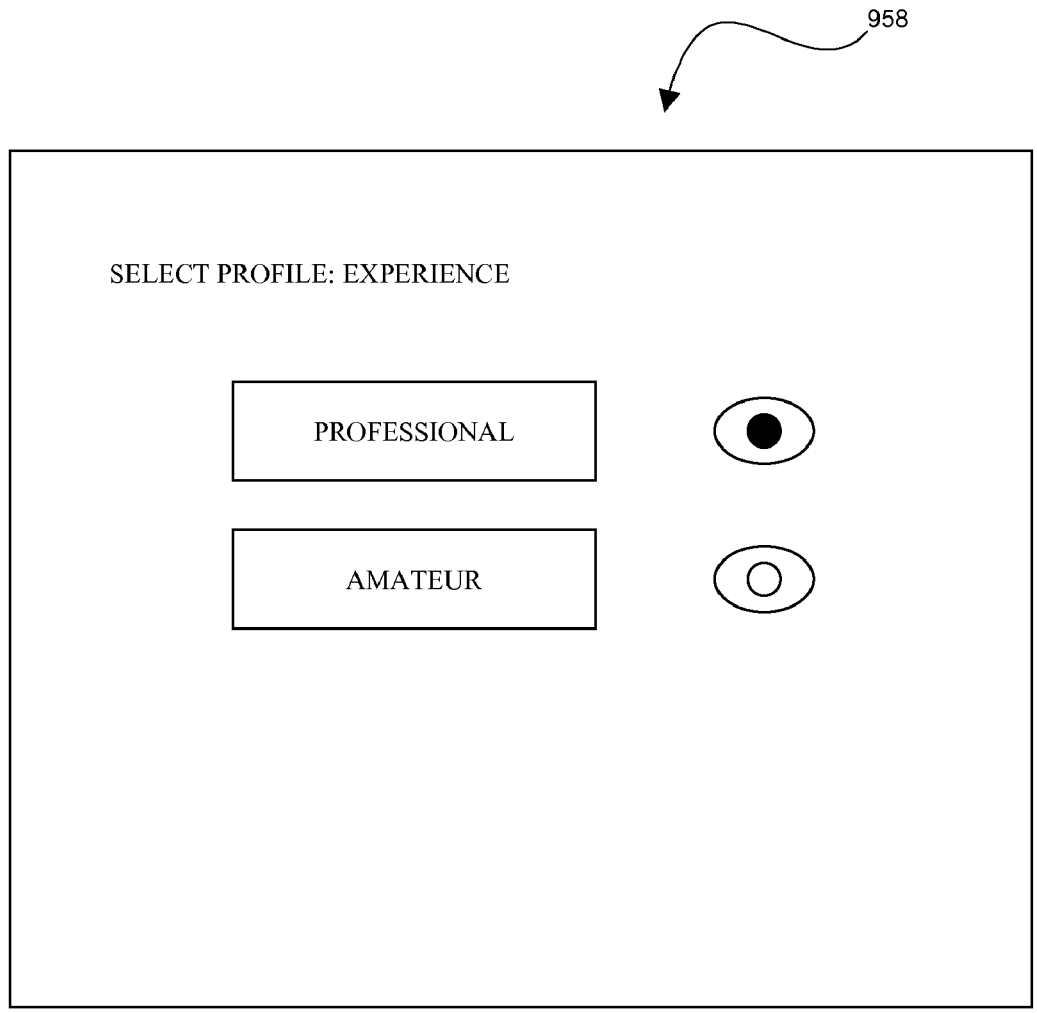
Figure 9F:
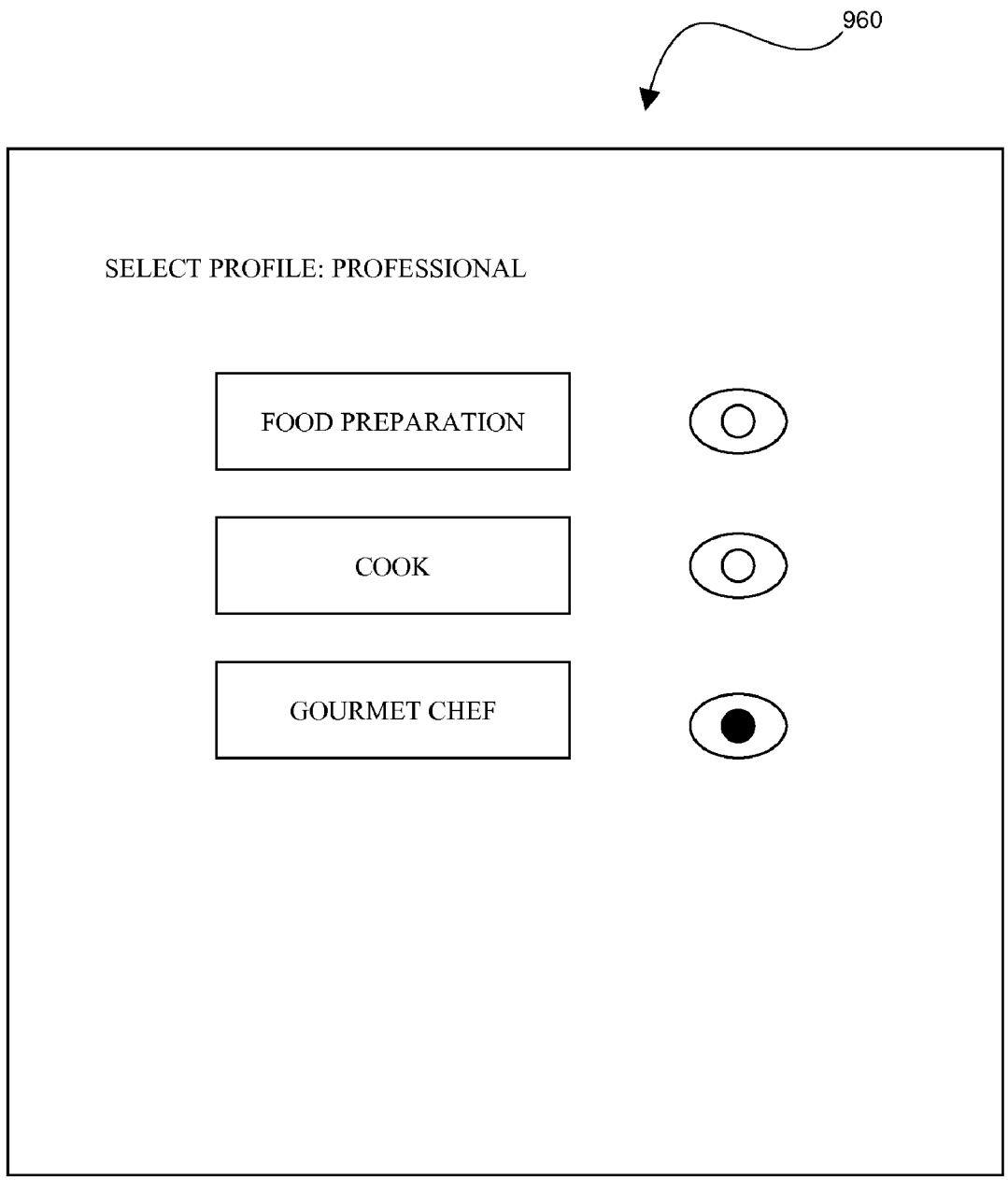

FIG. 9D illustrates an example display screen 956 for a user to select user profile information 302. In the example shown in FIG. 9D, the user has options to select gender, age, experience and nationality. In example display screen 958 shown in FIG. 9E, the user is provided with options for experience, previously selected from screen 956, which include professional and amateur. In example display screen 960 shown in FIG. 9F, the user is provided with options for professional experience, previously selected from screen 958, which include food preparation experience, experience as a cook, and experience as a gourmet chef.

Figure 9G:
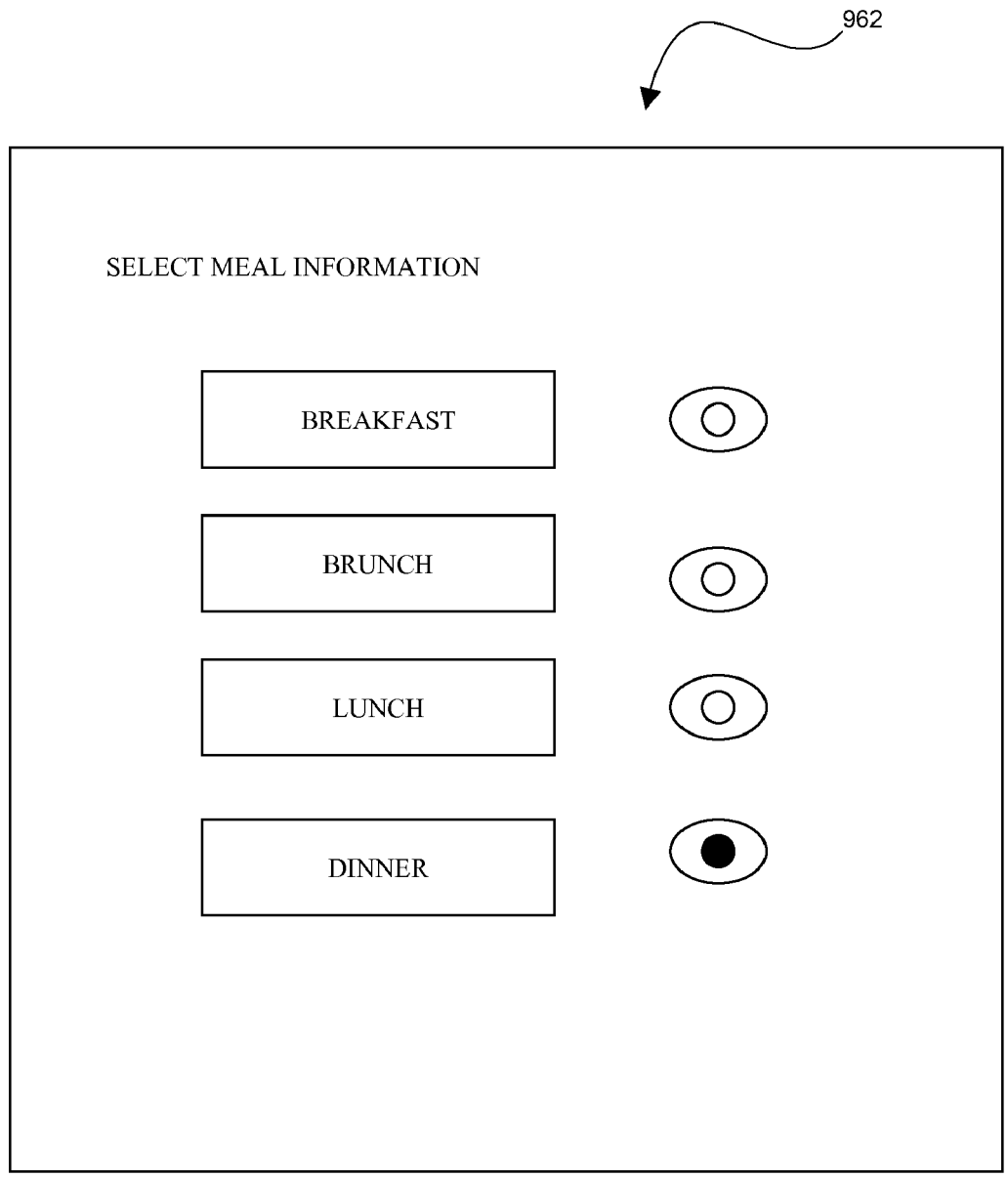
Figure 9H:
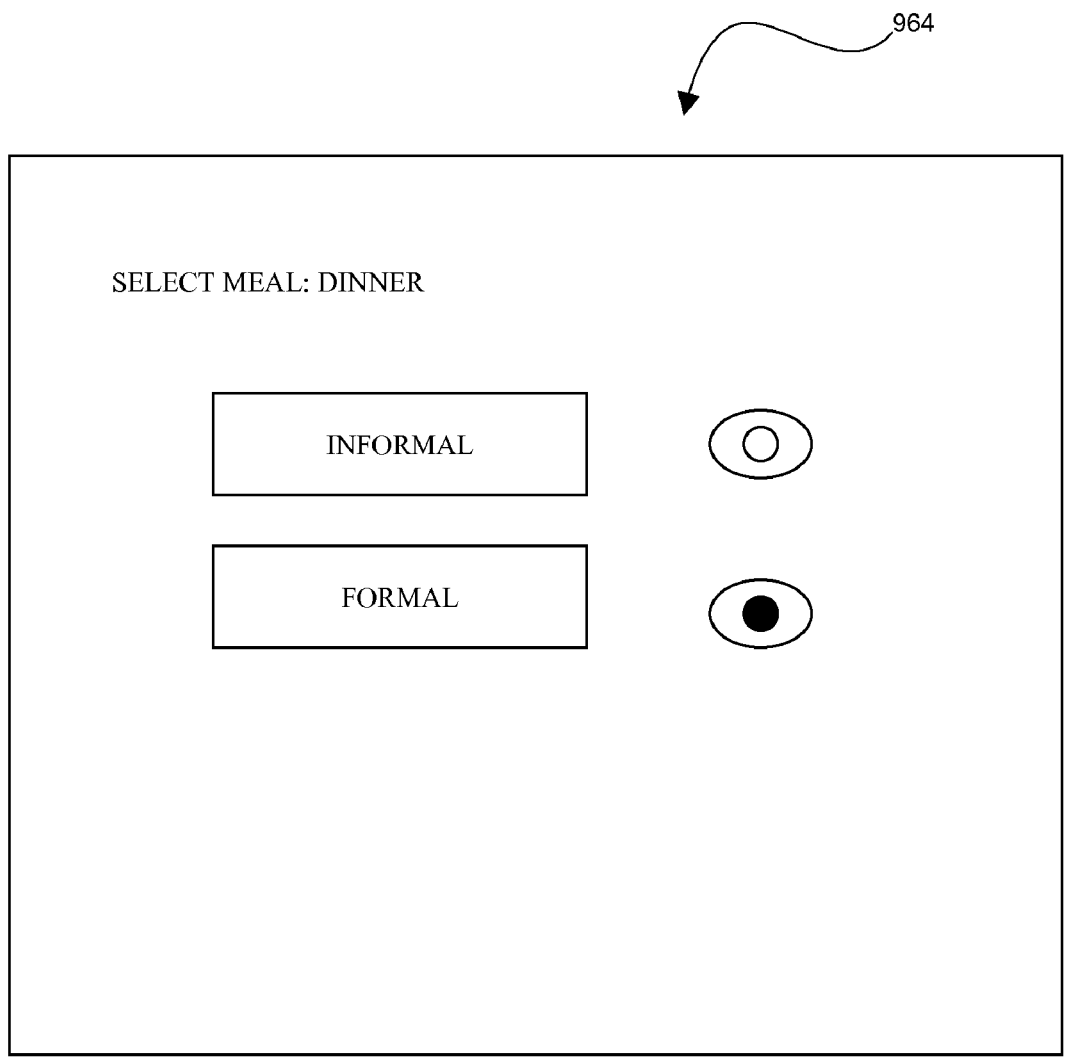
Figure 9I:
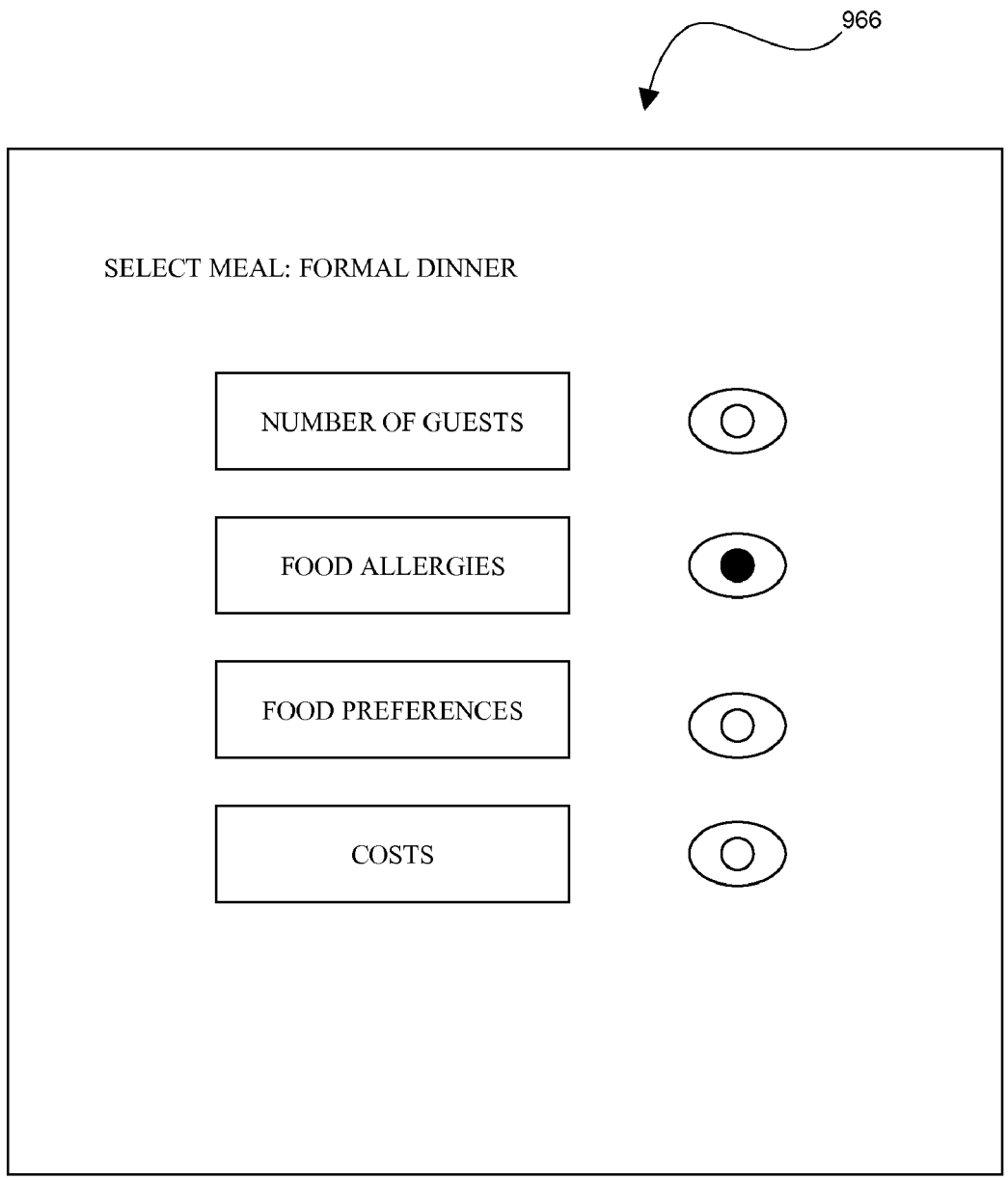

FIG. 9G illustrates an example display screen 962 for a user to select meal event information 304. In the example shown in FIG. 9G, the user is provided options to select breakfast, brunch, lunch and dinner. In example display screen 964 shown in FIG. 9H, the user is provided with options for dinner, previously selected from screen 962, which include informal and formal. In example display screen 966 shown in FIG. 9I, the user is provided with options for formal dinner, previously selected from screen 964, which include the number of guests, food allergies, food preferences and costs.

Figure 9J:
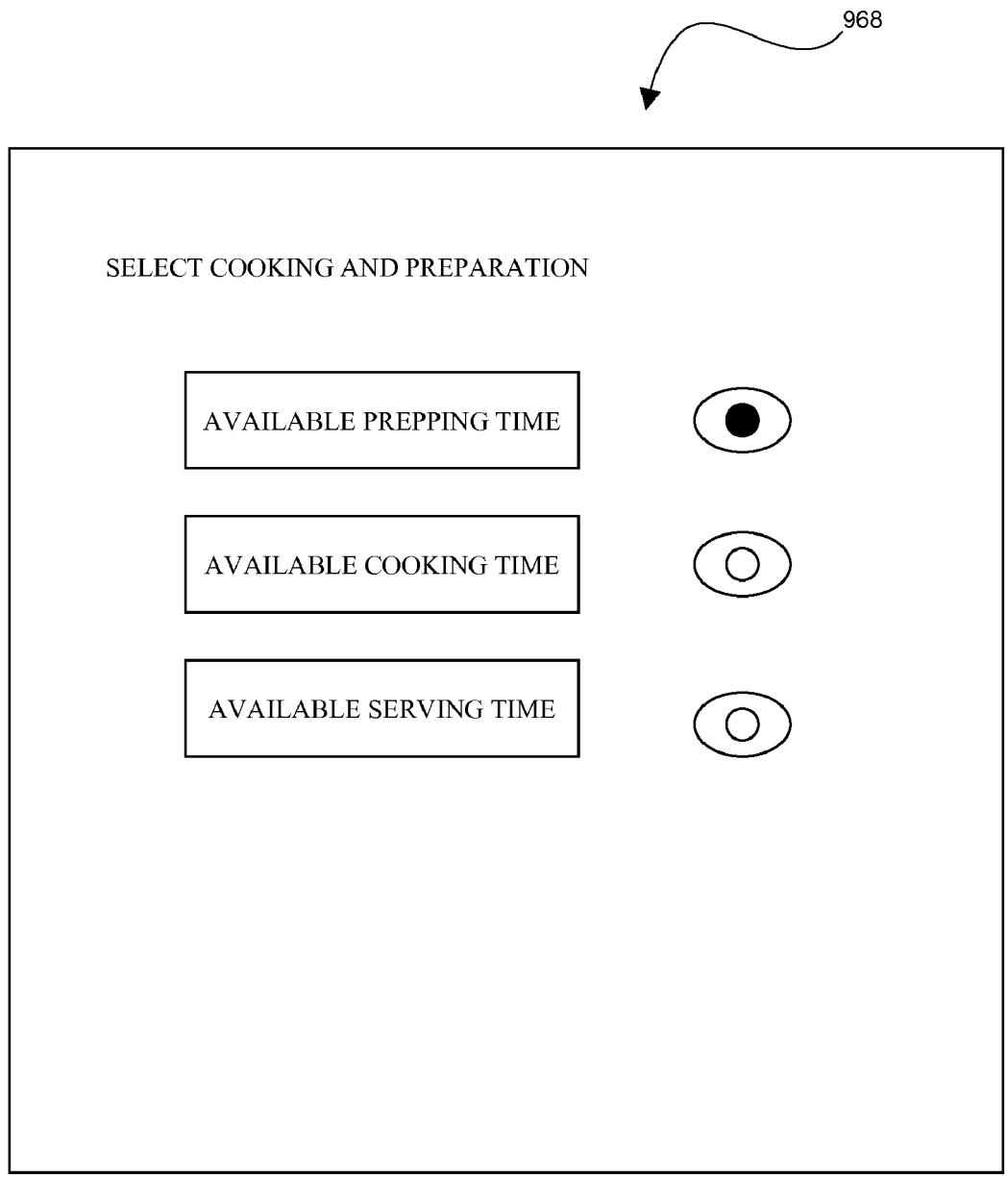
Figure 9K:
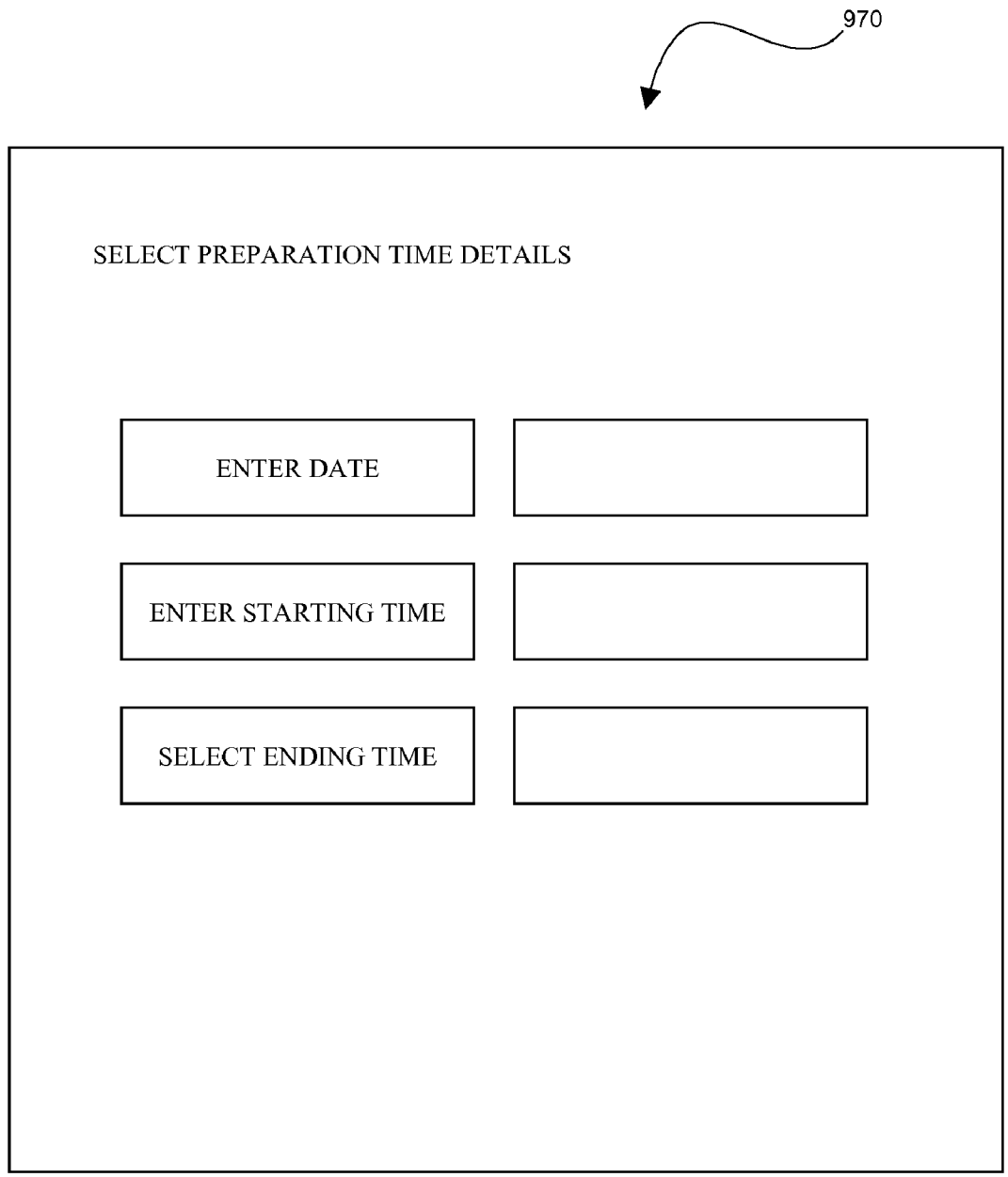

FIG. 9J illustrates an example display screen 968 for a user to select time information 308. In the example shown in FIG. 9J, the user is provided options to select available prepping time, available cooking time and available serving time. In example display screen 970 shown in FIG. 9K, the user is provided with options to enter information in data entry text boxes for food prepping (food preparation) time details, previously selected from screen 968, which include entering a date, starting time and ending time.

Thus, as shown in FIGS. 9A-9K, a data entry branching mechanism and process is provided for users to enter data conveniently and in various contexts.

Figure 10:
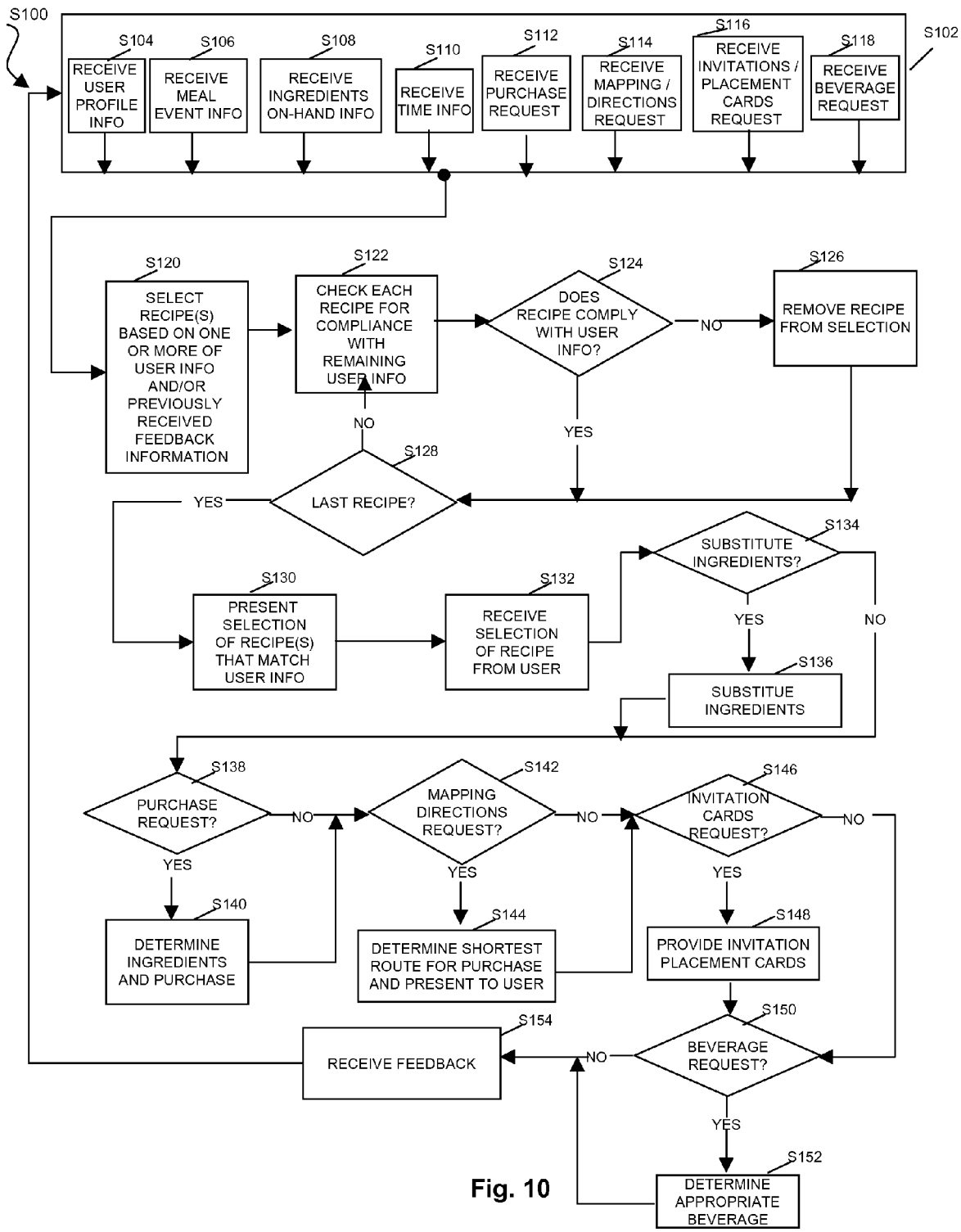
FIG. 10 is a flowchart identifying steps associated with functionality in accordance with an embodiment.

FIG. 10 is a flow chart illustrating steps S100 associated with receiving information from a user of information processor 102, and using the information to provide recipes, detailed estimates of time requirements, schedules for preparation and cooking, shopping instructions, as well as e-commerce and purchasing functionality. The steps illustrated in FIG. 10 represent an example embodiment, and are not meant to limit the teachings herein to the particular order or options and functionality shown therein.

Information is preferably received from a user, including user profile information 302 (step S104), meal event information 304 (step S106), ingredients on-hand information 306 (step S108) and time information 308 (step S110). In one embodiment, the information is received in response to data entry prompts, such as illustrated and described above with reference to FIGS. 5-9. The information received from a user in steps S104-S110 is preferably used by information processor to make meal suggestions, including to select appropriate recipes that match the parameters set forth by the user. For example, no meat recipes will be selected for a vegetarian. Steps S112-S118 represent requests that are received from a user, and include a request for ingredients to be purchased on behalf of the user (step S112), a request to receive mapping and/or directions to stores/suppliers of ingredients for a meal (step S114), a request for invitations and/or seating placement cards (step S116) and a request for a beverage selection (step S118). The sub-steps associated with step S102 are exemplary, and it is to be understood that one or combination of sub-steps associated with step S102 may be performed without departing from the teachings herein.

Continuing with reference to FIG. 10, information processor 102 receives information submitted by the user (steps S104-S118) and, in step S120, accesses one or more databases and selects one or more recipes that are based on at least one of the user provided information in sub-steps associated with step S102. Alternatively or in addition, information processor 102 references previously provided feedback information that was submitted by one or more users, and selects one or recipes, accordingly. Once recipes are selected in step S120, each of the selected recipes is checked to ensure the recipes comply with the user-supplied information (i.e., parameters) received in any of the steps S104-S110. At step S124, a determination is made whether a recipe is in compliance and, if not, the process branches to step S126 and the recipe is removed from the selection. For example, a recipe may be selected for a user whose profile information indicates a gourmet chef, but thereafter removed at step S126 when information processor 102 determines that the recipe does not comply with an allergy restriction submitted in step S106 and relating to one of the user's dinner guests. Thereafter, the process continues to step S128.

In case the determination at step S124 indicates that recipe complies with the user information received in sub-steps associated with step S102, the process branches to step S128, and a determination is made whether another recipe has been selected to be checked for compliance with user received information, or, alternatively, whether the recipe that was just checked at step S122 was the last recipe. In case another recipe is to be checked, the process branches back to step S122. Alternatively, the process branches to step S130, and information processor 102 presents the selection of remaining recipe(s) that match the user submitted information (sub-steps associated with step S102). For example, a list of recipes is presented in an Internet display screen with a respective photograph for each recipe. At step S132, a recipe(s) selection is received from the user. Thereafter, a determination is made whether any of the ingredients in the selected recipe(s) should be substituted in accordance with user profile information 302 received in step S104, meal event information 304 received in step S106, ingredients on-hand information 306 received in step S108 and/or timing information 308 received in step S110 (step S134). For example, user profile information 302 received in step S104 indicates that the user's financial budget is limited for a meal identified by meal event information 304. If so, then the process branches to step S136 and ingredients are substituted in the recipe for others. For example, and information processor 102 identifies that various expensive ingredients can be substituted for less expensive ones, and modifies the recipe accordingly.

Continuing with reference to FIG. 10, determinations are made for requests that may have been made by users and received by information processor 102 in one or more of steps S110-S118. At step S138, a determination is made whether the user requested that ingredients be purchased, such as via e-commerce. If so, then the process branches to determine which of the ingredients in the recipe(s) the user needs, based upon ingredients on-hand information 306 received in step S108, and ingredients are purchased as a function of e-commerce technology by information processor 102, substantially as described herein (step S140). If the no request for purchasing ingredients is received, or after step S140, the process branches to step S142 and a determination is made whether the user requested mapping information or directions to providers (e.g., stores) that are offering the ingredients for sale. If so, then the process branches to determine the shortest and/or economical purchasing options, and presents the options to the user, such as in the form of traveling directions, a map, a list of providers or a combination thereof. If no request for mapping or directions is received, or after step S144, the process branches to step S146 and a determination is made whether the user requested invitation cards, seating arrangement cards or other similar printed material for a meal event. If so, then the process branches to provide an interface enabling the user to design, select, print and/or order output, such as invitations (step S148). If no request for printed material is received, or after step S148, the process branches to step S150 and a determination is made whether the user requested a beverage selection. If so, then the process branches to step S152 and an appropriate selection of beverage is made for the user. For example, if the user is serving a fish in a creamy sauce, then information processor retrieves information from a database to recommend a particular kind of dry white wine. Thereafter, or if the result of the determination in step S146 was that no request was received, then the process branches to step S154 and feedback information is received from the user. For example, the user submits information representing how long the meal actually took to prepare and cook, which courses were particularly enjoyed or not, or any other feedback information the user deems pertinent. Thereafter, the process branches back to the step S102.

Figure 11:
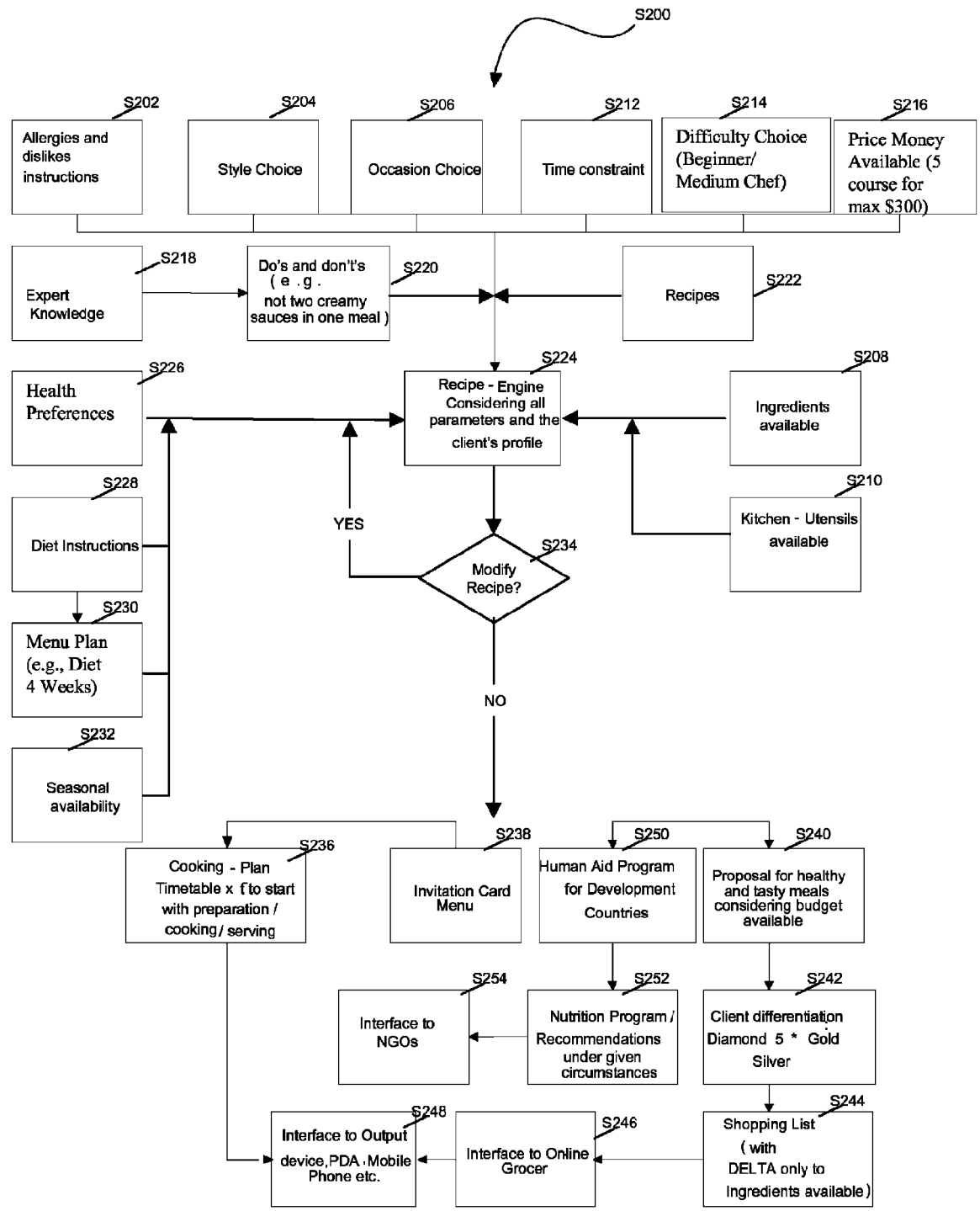
FIG. 11 is a flowchart identifying steps associated with functionality in accordance with an embodiment.

FIG. 11 is a flow chart illustrating steps S200 associated with an embodiment. As noted above, after a user is connected to information processor 102, the user is prompted to submit information regarding a particular meal or dinner event. For example, the user submits information relating to allergies or particular food-related dislikes (step S202). The user also is prompted to submit information relating to a choice of style of the food, such as Mediterranean, Japanese, Thai or the like (step S204). The user also is preferably prompted to submit information relating to the choice of occasion, such as a birthday, wedding anniversary, formal dinner party, or the like (step S206). Other information is similarly prompted for, such as the ingredients that are available to the user (step S208), and details regarding available kitchen equipment and utensils (step S210).

In addition to submitting information regarding details of the food and/or event, the user is also prompted to submit information regarding preparation constraints, such as time constraints (step S212), a desired difficulty level of the meal (step S214), and financial parameters, such as a maximum or minimum amount of money the user is willing to invest in the meal (step S216).

After information, such as described in steps S202-S216, is received from the user, information processor 102 preferably accesses one or more databases to locate recipe and meal information that matches or otherwise corresponds to the parameter information provided by the user. Moreover, information processor 102 preferably applies one or more predetermined rules, shown in FIG. 11 as "Expert Knowledge" (step S218), that are related to preferred or inappropriate combinations of foods, preferred or inappropriate ordering of courses, or other "do's and don'ts" (step S220), such as not serving two creamy sauces in a single meal, or the like. Information processor 102 further references a database of recipes (step S222), and selects one or more recipes that match the parameters provided by the user (step S224). For example, information that is submitted by a user and referenced by information processor 102 include health preferences (step S226), diet instructions (step S228), a four week menu plan, such as for a dieting period (e.g., four week diet) (step S230) and seasonal availability of fresh ingredients (step S232). Preferably, information processor 102 also provides an option for a user to make manual modifications to one or more recipes (step S234).

Continuing with reference to FIG. 11, once the recipes(s) are selected and/or modified, information processor 102 outputs information for the user, for example according to selections or instructions set forth by the user. For example, a cooking-plan timetable (X-T) is provided for preparing, cooking and/or serving a meal (step S236). Other output may include invitation card menu (step S238), wherein a user can select and provide invitations to guests that include, for example, the recipes that will be served for a dinner.

In one embodiment and as shown in FIG. 11, electronic, interactive (for example Internet) connectivity is provided to allow people select and purchase ingredients from grocers and in connection with budgetary parameters set forth by a user. For example, information processor 102 may make proposals for meals that are in line with a user's budget parameters that are preferably healthy and good tasting (step S240). Following such proposal, the process continues to determine a "client differentiation: such as diamond, gold or silver (step S242). Diamond may indicate that only ingredients of highest quality and relatively expensive (exquisite, exclusive) are part of the ingredients that are used to prepare the menu. Gold may indicate that a relatively high average of ingredients quality is to be used. Silver may refer to relatively inexpensive and/or common ingredients to be used for selected recipes.

Thereafter, the process continues to step S244, and a shopping list is preferably generated that identifies ingredients called for by the recipe that represent those ingredients that have not been listed by the user as already available. In other words, a delta calculation is performed representing the difference between the ingredients that are required for a recipe, and the ingredients that the user already has. The process continues to step S246, and information processor 102 interfaces with a grocer (i.e., provider of foods and/or ingredients) via an Internet-based interface. In one embodiment, information processor 102 automatically submits payment information to the grocer on behalf of the user, or, alternatively, the user is provided with access to the grocer's e-commerce interface and the user submits payment himself. Thereafter, information processor 102 outputs information to a device, such as a printer, a mobile telephone, a personal digital assistant, short messaging service ("SMS") device or other data receiving or displaying device (step S248).

In addition to enabling people to select and purchase ingredients for recipes, information processor 102 also provides an option for providing nutritional information, for example, for a human aid program directed to developing countries around the world (step S250). With the selection of this option, information processor 102 identifies nutrition program and recommendations under given circumstances (step S252). Moreover, information processor 102 interfaces with non-government organization (step S254).

The teachings herein are now further described with reference to examples. A person living in New York City enjoys Mediterranean-style food and has an informal dinner planned for the following weekend for four adults. The person wishes to prepare a three-course meal. Guests are expected to arrive at 6:00 p.m. and the user would like to start with appetizers or snacks. The user is requesting that information processor 102 provides a proposal for a meal plan that corresponds with the user's submitted requirements. The user further requests that information processor 102 identify establishments where the user can purchase necessary ingredients for the meal, as well as full instructions for preparation, cooking and serving. The individual establishes a communication session with information processor 102 and accesses the website and submits information in a data entry display form that identifies the meal, the number of adults, the data and time of the event, whether the event is formal or informal, where the event is occurring, the preferred cuisine and a particular desirable food.

Additionally, the user supplies available foods and/or ingredients that the user has available for cooking this particular meal. Moreover, the user identifies his or her respective cooking experience level, the amount of time that the person has to prepare and cook the food, and the type of equipment that the user has. For example, the user identifies whether the user has never cooked before, is a beginner, has some experience, is a regular cook, has a lot of experience or considers him or herself proficient in cooking. With regard to time, the user may identify particular days prior to the dinner and the amount of time per day that the user has available therefor. For example, the user may submit that he or she has four hours on Wednesday and one hour on Saturday to complete preparation and cooking of the meal. With regard to equipment, the user may select from a dropdown list, a selection of check boxes, radio buttons or other suitable graphical screen controls for selecting and identifying data in connection with available equipment. For example, the user might select a twelve-inch frying pan, a nine-inch frying pan, a fifteen-inch casserole dish or the like.

Further, the user identifies preferred output that is provided by information processor 102 in connection with the meal. For example, the user identifies whether he would like a shopping list, whether he would like the system to automatically purchase the ingredients that he needs for the meal, whether he would like invitations to be prepared and ordered, whether he would like a time line and working plan defined for him and whether or not he would like beverage recommendations made for the meal.

In response to the user's request, information processor 102 proposes a dinner menu, starting with an appetizer, followed by three courses that will all be ready at a designated time. Preparation, coordination and consolidation are all provided in a convenient and cost effective process, which minimize requirements. Furthermore, appropriate décor, music or other ambiance suggestions may be made by information processor 102.

Following the meal, such as the next day, the user receives a communication, such as an e-mail message, that includes or points the user to a data entry form with a series of questions regarding the meal, the event in general and additional data entry options to identify aspects of the meal, including the preparation of each of the recipes (e.g., times, quality, unexpected conditions, successes or the like). Other features that may be provided include the level of enjoyment of the recipes by the guests (e.g., the respective guests' likes and dislikes of various courses), various substitutions of ingredients and whether the substitutions were successful, or the like. As noted above, information processor 102 preferably stores the feedback information in a database for future reference. For example, the user may identify to information processor 102 that he possesses an intermediate level of skills in food preparation, and information processor 102 determines, based on the user's feedback, that foods took substantially longer to prepare, were not prepared correctly, and, accordingly, information processor 102 modifies the user's skill level from intermediate to beginner. Moreover, a preparer identified as a beginner level may be changed to an intermediate level after a relatively challenging recipe or meal is successfully prepared thereby. It is recognized by the inventor that successful preparations of foods is a motivating factor in improving one's food preparation skill level.

In another example, a user living in Rome, Italy enjoys Mediterranean food and plans a formal dinner for the following weekend for six adults. The user desires to prepare a four-course dinner at her home, and to spend not more than €220 for the meal. Guests are scheduled to arrive at 7:00 p.m., and the host wants to serve apéro. One of the guests is a vegetarian, another has an allergy to nuts and yet another guest does not like shrimp. The user requests that information processor 102 submit a proposed menu that complies with the foregoing, and provide details for shopping, food preparation and cooking.

Once a connection to information processor 102 has been made, the user submits the above-identified criteria, including the requirement of no nuts, no shrimp and one vegetarian. Information processor 102 prompts the user to submit her user name and password to enable information processor 102 to reference the user's profile. In this example, the user has not yet registered with information processor 102. The user submits information, such as described above with reference to FIG. 6, including demographic, payment and/or cooking experience information. The user selects an option to access information processor 102 to avail herself of the teachings herein on a no-cost, temporary trial basis, such as described above.

Continuing with the current example, the user submits information regarding the meal, including information regarding the event, the guests, the season, preferences, allergies and the location, which are available for use for shopping/ordering the ingredients. Accordingly, the user submits the number of courses, the number and age classifications of the attendees, the degree of formality, the location of the meal, and meal specifics, such as one vegetarian, and no shrimp and no nuts to information processor 102. Thereafter, the user replies to prompts from information processor 102 relating to available, refrigerated (i.e., very perishable) ingredients that the user desires to use, e.g., 1,000 grams of tomatoes, 200 grams of parmesan cheese, 100 grams of black olives. Information processor 102 uses the available ingredient information submitted by the user to make meal recommendations The user further submits information relating to less perishable ingredients that the user has available, such as flour, potatoes, vanilla, salt, pepper, hone, canned apricot, onions, etc. The user further submits, for example and in response to prompts for profile information, the preparer's cooking skill level, and also submits the days and amount of time per day that the user has available for prepping and cooking. The user also submits available cooking equipment, available wines, and selects options directed to output that the user desires to receive. For example, the user selects that she wants an e-mail sent to her of data output, substantially as described herein, directed to the meal. The user further selects that she wants ingredients that she requires to be automatically ordered and paid for, and to receive a virtual invitation that she can print and send to her guests, either electronically or via mail. Additionally, menu cards are preferably prepared by information processor 102 and available for the user to print and place at each place setting at the table during the meal. The user also requests wine, music, table décor, flowers and dress-code recommendations from information processor 102. Accordingly, information processor 102 references one or more databases to provide appropriate recommendations in response to the user requests.

Thus, the teachings herein provide a tremendous variety of information for people preparing meals, that relies on many parameters, including the skills of the person preparing a meal, the food (e.g., ingredients) that is available to the preparer, the amount of time required to prepare a number of recipes, available cooking equipment, the season in which food is to be prepared, and the preferences of the preparer and other people who will be eating the food. By receiving and considering the information provided in connection with these parameters, new sets of solutions are provided in accordance with the teachings herein that are not available in prior art cookbooks, Internet websites, televised or video cooking shows, or the like. Valuable contextual information is also provided, such as directed to the social status of the host and/or guests, the number of times that a guest to a dinner prepared by a host has attended a dinner, and appropriate combinations of different recipes that are taken from different sources, such as cookbooks, websites or the like. Using the teaching sand methods provided herein, the risk that individual courses of a complete meal do not fit well together is eliminated and, in fact, are users are assured that a plurality of courses, and the order of the courses, are combined in complimentary ways, Further, and to add to the convenience and enjoyment of the teachings herein, ingredients that are available in stores and shops can be automatically ordered and purchased for a user, thereby reducing the amount of time and uncertainty in preparing a meal. Thus, the teachings herein provide enormous benefits over the prior art, and result in cost and time savings, as well in creative and enjoyable meals.

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A method for providing electronic meal information associated with a meal requiring at least two recipes to a user, the method comprising:

storing, on one or more processor readable media that are operatively coupled to one or more processors, at least one database comprising at least:
electronic user information representing levels of cooking skills respectively associated with a plurality of users;
electronic recipe information including information representing a plurality of food recipes;
electronic recipe attribute information including information representing respective attributes of a plurality of ingredients for the plurality of food recipes;
electronic process information including information representing processes associated with the plurality of recipes; and
electronic time information including information representing time associated with the processes;
providing, by the one or more processors, a web site linked to the Internet that includes at least: a first prompt for electronic food information representing at least one characteristic of a meal; a second prompt for electronic available ingredient information representing at least one ingredient that the user has available for the meal; and a third prompt for electronic time information representing time;

receiving from the computing device, in response to the first prompt, first electronic food information representing a characteristic of the meal;

receiving from the computing device, in response to the second prompt, first electronic ingredient information representing ingredients in possession of the user;

receiving from the computing device, in response to the third prompt, first electronic time information representing at least one of starting time and ending time, and further representing an amount of time available to the user for preparing the meal;

selecting, by the one or more processors, at least some of the electronic recipe information for a plurality of recipes, wherein the selecting is based at least on the first electronic food information, the first electronic ingredient information and the first electronic time information; and calculating, by the one or more processors, at least one of a starting time for preparing at least one of the recipes associated with the meal, and an ending time for preparing at least one of the recipes associated with the meal, wherein the calculating is based on at least some of the electronic time information and at least some of the electronic user information; and generating, by the one or more processors, electronic meal information that includes a time schedule for preparing the plurality of recipes and further includes an electronic list of ingredients for each of the plurality of recipes and further includes a starting time for at least one of the plurality of recipes, wherein the electronic list includes the difference between ingredients in the electronic meal recipe information, and at least one ingredient in the electronic ingredient information, and further wherein the electronic meal information includes selected recipe attributes for the ingredients in the electronic list.

2. The method of claim 1, further comprising communicating, by the one or more processors, the electronic list to at least one seller of ingredients.

3. The method of claim 2, further comprising:
receiving from the computing device, electronic payment information for paying for ingredients; and
purchasing, by the one or more processors and from the at least one seller, ingredients identified in the electronic list, wherein the purchasing occurs as a function of the electronic payment information.

4. The method of claim 1, further comprising:
providing in the web site an attribute prompt for electronic preferred meal attribute information representing at least one preferred attribute for the meal; and
receiving from the computing device, in response to the attribute prompt, the electronic preferred meal attribute information,
wherein the generating the electronic meal recipe information further includes selecting at least some of the electronic recipe information that corresponds to the electronic preferred meal attribute information.

5. The method of claim 1, further comprising:
providing in the web site a time prompt for electronic preparation time information representing a time when the user can make the meal;
receiving from the computing device, in response to the time prompt, the electronic preparation time information; and generating, by the one or more processors, an electronic schedule for performing each of the processes for the meal as a function of at least some of the electronic process information, at least some of the electronic time information, and the electronic preparation time information; and providing the electronic schedule to the computing device.

6. The method of claim 1, wherein the electronic meal recipe information includes a plurality of recipes for the meal.

7. The method of claim 1, further comprising providing to the computing device a prompt for electronic feedback information, wherein the electronic feedback information represents at least one description of the meal after the meal was made.

8. The method of claim 1, further comprising:
providing in the web site a user-description prompt for electronic user information representing the cooking skill level of the user; and
receiving from the computing device, in response to the user-description prompt, the electronic user information,
wherein the generating the electronic meal recipe information further includes selecting at least some of the electronic recipe information that corresponds to the electronic user information.

9. The method of claim 1, further comprising:
storing in the database electronic seller information representing at least sellers of ingredients for the plurality of recipes;
generating, by the one or more processors, an electronic shopping list that corresponds to the electronic list, wherein the generating identifies a plurality of sellers of ingredients in the electronic list, and selecting at least one of the plurality of sellers according to the price that the at least one of the sellers offers the ingredients for sale; and
providing the electronic shopping list to the user.

10. The method of claim 9, wherein the selecting at least one of the plurality of sellers is done according to a geographic location of the at least one of the sellers.

11. A system for providing electronic meal information to a user, the system comprising:
one or more processor readable media;
one or more processors operatively coupled to the one or more processor readable media;
at least one database stored on the one or more processor readable media, the at least one database comprising:
electronic recipe information including information representing a plurality of food recipes;
electronic recipe attribute information comprising information representing respective attributes of a plurality of ingredients for the plurality of food recipes;
electronic process information including information representing processes associated with the plurality of food recipes; and
electronic time information including information representing time associated with the processes;
the one or more processor readable media having instructions for causing the following steps to be performed by the one or more processors:
providing a web site linked to the Internet that includes at least a first prompt for electronic food information representing at least one characteristic of a meal; a second prompt for the user to submit electronic available ingredient information representing at least one ingredient that the user has available for the meal; and a third prompt for electronic time information representing time;

receiving from the computing device, in response to the first prompt, first electronic food information representing a characteristic of the meal;

receiving from the computing device, in response to the second prompt, first electronic ingredient information representing ingredients in possession of the user;

receiving from the computing device, in response to the third prompt, first electronic time information representing at least one of starting time and ending time, and further representing an amount of time available to the user for preparing the meal;

selecting at least some of the electronic recipe information for a plurality of recipes, wherein the selecting is based at least on the first electronic food information, the first electronic ingredient information and the first electronic time information, calculating, by the one or more processors, at least one of a starting time for preparing at least one of the recipes associated with the meal, and an ending time for preparing at least one of the recipes associated with the meal, wherein the calculating is based on at least some of the electronic time information and at least some of the electronic user information; and generating electronic meal information that includes a time schedule for preparing the plurality of recipes and further includes an electronic list of ingredients for each of the plurality of recipes and further includes a starting time for at least one of the plurality of recipes, wherein the electronic list includes the difference between ingredients in the electronic meal recipe information, and at least one ingredient in the electronic ingredient information, and further wherein the electronic meal information includes selected recipe attributes for the ingredients in the electronic list.

12. The system of claim 11, wherein the one or more processor readable media further have instructions for causing the one or more processors to communicate the electronic list to at least one seller of ingredients.

13. The system of claim 11, wherein the one or more processor readable media further have instructions for causing the one or more processors to perform:
receiving from the computing device, electronic payment information for paying for ingredients; and
purchasing from the at least one seller, ingredients identified in the electronic list, wherein the purchasing occurs as a function of the electronic payment information.

14. The system of claim 11, wherein the one or more processor readable media further have instructions for causing the one or more processors to perform:
providing in the web site an attribute prompt for electronic preferred meal attribute information representing at least one preferred attribute for the meal; and
receiving from the computing device, in response to the attribute prompt, the electronic preferred meal attribute information,
wherein the generating the electronic meal recipe information further includes selecting at least some of the electronic recipe information that corresponds to the electronic preferred meal attribute information.

15. The system of claim 11, wherein the one or more processor readable media further have instructions for causing the one or more processors to perform:
providing in the web site a time prompt for electronic preparation time information representing a time when the user can make the meal;
receiving from the computing device, in response to the time prompt, the electronic preparation time information; and
generating an electronic schedule for performing each of the processes for the meal as a function of at least some of the electronic process information, at least some of the electronic time information, and the electronic preparation time information; and
providing the electronic schedule to the computing device.

16. The system of claim 11, wherein the electronic meal recipe information includes a plurality of recipes for the meal.

17. The system of claim 11, wherein the one or more processor readable media further have instructions for causing the one or more processors to provide to the computing device a prompt for electronic feedback information, wherein the electronic feedback information represents at least one description of the meal after the meal was made.

18. The system of claim 11, wherein the one or more processor readable media further have instructions for causing the one or more processors to perform:
providing in the web site a user-description prompt for electronic user information representing the cooking skill level of the user; and
receiving from the computing device, in response to the user-description prompt, the electronic user information,
wherein the generating the electronic meal recipe information further includes selecting at least some of the electronic recipe information that corresponds to the electronic user information.

19. The system of claim 11, wherein the one or more processor readable media further have instructions for causing the one or more processors to perform:
storing in the database electronic seller information representing at least sellers of ingredients for the plurality of recipes;
generating an electronic shopping list that corresponds to the electronic list, wherein the generating identifies a plurality of sellers of ingredients in the electronic list, and selecting at least one of the plurality of sellers according to the price that the at least one of the sellers offers the ingredients for sale; and
providing the electronic shopping list to the user.

* * * * *